US008077974B2

(12) United States Patent
Kumar et al.

(10) Patent No.: US 8,077,974 B2
(45) Date of Patent: Dec. 13, 2011

(54) COMPACT STYLUS-BASED INPUT TECHNIQUE FOR INDIC SCRIPTS

(75) Inventors: Manish Kumar, Bangalore (IN); Mudit Agrawal, Greenbelt, MD (US); Sriganesh Madhvanath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1174 days.

(21) Appl. No.: 11/685,211

(22) Filed: Mar. 13, 2007

(65) Prior Publication Data

US 2008/0025613 A1    Jan. 31, 2008

(30) Foreign Application Priority Data

Jul. 28, 2006   (IN) ............................ 1332/CHE/2006

(51) Int. Cl.
    *G06K 9/18*      (2006.01)
(52) U.S. Cl. ....................................... 382/186; 345/179
(58) Field of Classification Search .......... 382/182–189; 345/173–184
See application file for complete search history.

(56) References Cited

U.S. PATENT DOCUMENTS

| 3,944,042 A | 3/1976 | Gremillet |
|---|---|---|
| 4,010,837 A | 3/1977 | Gremillet |
| 4,051,606 A | 10/1977 | Tozo |
| 4,123,795 A | 10/1978 | Dean, Jr. |
| 4,136,399 A | 1/1979 | Chan et al. |
| 4,137,425 A | 1/1979 | Ferroglio et al. |
| 4,150,197 A | 4/1979 | Zaromb |
| 4,161,624 A | 7/1979 | Brosow et al. |
| 4,180,337 A | 12/1979 | Otey, III et al. |
| 4,435,752 A | 3/1984 | Winkelman |
| 4,713,775 A | 12/1987 | Scott et al. |
| 4,866,440 A | 9/1989 | Tsukiyama et al. |

(Continued)

FOREIGN PATENT DOCUMENTS

CA     2114771     8/1995

(Continued)

OTHER PUBLICATIONS

Andriy Pavlovych et al., "Less-Tap: A Fast and Easy-to-learn Text Input Technique for Phones," Department of Computer Science, York University, Toronto, Ontario, Canada, Jun. 2003, Morgan Kaufmann Publishers.

(Continued)

*Primary Examiner* — Aaron W Carter

(57) ABSTRACT

A technique for stylus-based syllabic input that is fast and easy and does not require any additional hardware and can be deployed on a handheld device is described. In one example embodiment, this is accomplished by writing a base syllabic character consisting of a vowels or consonant in a writing area. One or more modifiers that are displayed as icons substantially around the writing area of a syllabic level user interface are then selected to form a desired syllabic character. The one or more modifiers are arranged at familiar/natural positions around the base character's writing area to facilitate entry/selection of modifiers and to reduce eye movement/cognitive load on the user. The syllabic characters are then accumulated locally until a desired word is formed, to reduce visual disconnect between the input interface and the end application, and to provide context for formation of the desired word. Further, one or more hypothesis words are then presented to speed up the formation and inputting of a desired word. The formed desired word is then cleared from the display area and sent to an application display area by tapping a space button provided in the syllabic character input user interface.

24 Claims, 18 Drawing Sheets

U.S. PATENT DOCUMENTS

| | | | |
|---|---|---|---|
| 5,128,672 A | 7/1992 | Kachier | |
| 5,182,709 A | 1/1993 | Makus | |
| 5,231,696 A | 7/1993 | Roux et al. | |
| 5,294,982 A | 3/1994 | Salomon | |
| 5,305,394 A * | 4/1994 | Tanaka | 382/189 |
| 5,333,269 A | 7/1994 | Calvignac et al. | |
| 5,416,898 A | 5/1995 | Opstad et al. | |
| 5,432,948 A | 7/1995 | Davis et al. | |
| 5,467,470 A | 11/1995 | Ninomiya | |
| 5,517,253 A | 5/1996 | De Lange | |
| 5,519,443 A | 5/1996 | Salomon et al. | |
| 5,561,764 A | 10/1996 | Ninomiya | |
| 5,630,186 A | 5/1997 | Yamaguchi | |
| 5,640,587 A | 6/1997 | Davis et al. | |
| 5,657,259 A | 8/1997 | Davis et al. | |
| 5,682,158 A | 10/1997 | Edberg et al. | |
| 5,699,455 A * | 12/1997 | Arai et al. | 382/187 |
| 5,784,069 A | 7/1998 | Daniels et al. | |
| 5,784,071 A | 7/1998 | Tang | |
| 5,793,381 A | 8/1998 | Edberg et al. | |
| 5,841,901 A * | 11/1998 | Arai et al. | 382/187 |
| 5,870,084 A | 2/1999 | Kanungo et al. | |
| 5,870,492 A * | 2/1999 | Shimizu et al. | 382/187 |
| 5,873,111 A | 2/1999 | Edberg | |
| 5,878,385 A | 3/1999 | Bralich et al. | |
| 5,924,103 A | 7/1999 | Ahmed et al. | |
| 5,926,566 A * | 7/1999 | Wang et al. | 382/185 |
| 5,966,637 A | 10/1999 | Kanungo et al. | |
| 5,966,719 A | 10/1999 | Okumura | |
| 6,005,973 A * | 12/1999 | Seybold et al. | 382/187 |
| H1830 H | 1/2000 | Petrimoulx et al. | |
| 6,011,761 A | 1/2000 | Inoue | |
| 6,028,959 A * | 2/2000 | Wang et al. | 382/185 |
| 6,037,137 A | 3/2000 | Komoriya | |
| 6,052,482 A * | 4/2000 | Arai et al. | 382/187 |
| 6,057,503 A | 5/2000 | Shinsky | |
| 6,064,765 A * | 5/2000 | Hirayama | 382/189 |
| 6,097,557 A | 8/2000 | Inoue et al. | |
| 6,141,002 A | 10/2000 | Kanungo et al. | |
| 6,148,104 A * | 11/2000 | Wang et al. | 382/185 |
| 6,151,286 A | 11/2000 | Inoue | |
| 6,156,965 A | 12/2000 | Shinsky | |
| 6,185,333 B1 * | 2/2001 | Arai et al. | 382/187 |
| 6,229,919 B1 * | 5/2001 | Hirayama | 382/187 |
| 6,266,664 B1 | 7/2001 | Russell Falla et al. | |
| 6,272,243 B1 * | 8/2001 | Ulgen et al. | 382/187 |
| 6,300,934 B1 | 10/2001 | Ko et al. | |
| 6,314,469 B1 | 11/2001 | Tan | |
| 6,329,018 B1 | 12/2001 | Toshinao | |
| 6,366,953 B2 | 4/2002 | Inoue | |
| 6,370,363 B1 | 4/2002 | Fukuzato | |
| 6,389,445 B1 | 5/2002 | Tsividis et al. | |
| 6,426,751 B1 | 7/2002 | Patel et al. | |
| 6,430,314 B1 | 8/2002 | Ko | |
| 6,446,133 B1 | 9/2002 | Seng et al. | |
| 6,462,678 B1 | 10/2002 | Ahn | |
| 6,526,546 B1 | 2/2003 | Rolland et al. | |
| 6,535,489 B1 | 3/2003 | Merchant et al. | |
| 6,675,162 B1 | 1/2004 | Russell-Falla et al. | |
| 6,694,056 B1 * | 2/2004 | Ito et al. | 382/186 |
| 6,697,524 B1 * | 2/2004 | Arai et al. | 382/187 |
| 6,702,676 B1 | 3/2004 | Ota et al. | |
| 6,729,389 B2 | 5/2004 | Ohashi | |
| 6,750,875 B1 | 6/2004 | Keely | |
| 6,757,688 B1 | 6/2004 | Leapaldt et al. | |
| 6,760,477 B2 | 7/2004 | Ko | |
| 6,760,695 B1 | 7/2004 | Kuno et al. | |
| 6,769,062 B1 | 7/2004 | Smeets et al. | |
| 6,795,579 B2 * | 9/2004 | Tang et al. | 382/185 |
| 6,915,115 B2 | 7/2005 | Fukuzato | |
| 7,030,863 B2 | 4/2006 | Longe | |
| 7,039,172 B2 | 5/2006 | Wrobel | |
| 7,050,198 B2 | 5/2006 | Ooi et al. | |
| 7,103,008 B2 | 9/2006 | Greenblat et al. | |
| 7,130,850 B2 | 10/2006 | Russell-Falla et al. | |
| 7,177,798 B2 | 2/2007 | Hsu et al. | |
| 7,187,365 B2 | 3/2007 | Harman | |
| 7,188,115 B2 | 3/2007 | Farn et al. | |
| 7,248,678 B2 | 7/2007 | Adams et al. | |
| 7,249,095 B2 | 7/2007 | Davies et al. | |
| 7,271,806 B2 | 9/2007 | Everett | |
| 7,319,957 B2 | 1/2008 | Robinson et al. | |
| 7,385,606 B2 | 6/2008 | Everett et al. | |
| 7,443,386 B2 * | 10/2008 | Gao et al. | 345/173 |
| 7,586,628 B2 | 9/2009 | Engelman et al. | |
| 7,609,268 B2 | 10/2009 | Kotiranta | |
| 7,636,083 B2 | 12/2009 | Aoki et al. | |
| 7,925,091 B2 * | 4/2011 | Chaoweeraprasit et al. | 382/182 |
| 7,941,311 B2 | 5/2011 | Kaplan et al. | |
| 7,979,795 B2 * | 7/2011 | Borgaonkar et al. | 715/268 |
| 2001/0025320 A1 | 9/2001 | Seng et al. | |
| 2001/0047346 A1 | 11/2001 | Liu et al. | |
| 2002/0098811 A1 | 7/2002 | Fukuzato | |
| 2002/0146181 A1 | 10/2002 | Azam et al. | |
| 2002/0168107 A1 * | 11/2002 | Tang et al. | 382/187 |
| 2003/0125930 A1 | 7/2003 | Stepak | |
| 2003/0135445 A1 | 7/2003 | Herz et al. | |
| 2003/0167348 A1 | 9/2003 | Greenblat | |
| 2003/0172189 A1 | 9/2003 | Greenblat | |
| 2003/0172190 A1 | 9/2003 | Greenblat | |
| 2003/0189940 A1 | 10/2003 | Greenblat | |
| 2003/0191861 A1 | 10/2003 | Greenblat | |
| 2003/0191862 A1 | 10/2003 | Greenblat | |
| 2003/0191863 A1 | 10/2003 | Greenblat | |
| 2003/0195989 A1 | 10/2003 | Greenblat | |
| 2003/0195990 A1 | 10/2003 | Greenblat | |
| 2003/0195991 A1 | 10/2003 | Masel et al. | |
| 2003/0196076 A1 | 10/2003 | Zabarski et al. | |
| 2003/0200339 A1 | 10/2003 | Greenblat et al. | |
| 2003/0200342 A1 | 10/2003 | Greenblat et al. | |
| 2003/0200343 A1 | 10/2003 | Greenblat et al. | |
| 2003/0204636 A1 | 10/2003 | Greenblat et al. | |
| 2003/0212830 A1 | 11/2003 | Greenblat et al. | |
| 2004/0119714 A1 | 6/2004 | Everett et al. | |
| 2004/0153306 A1 | 8/2004 | Tanner et al. | |
| 2004/0161151 A1 * | 8/2004 | Iwayama et al. | 382/187 |
| 2004/0181776 A1 | 9/2004 | Atkin et al. | |
| 2004/0227900 A1 | 11/2004 | Sato et al. | |
| 2004/0247053 A1 | 12/2004 | Rached et al. | |
| 2005/0182616 A1 | 8/2005 | Kotipalli | |
| 2005/0182794 A1 | 8/2005 | Masui | |
| 2005/0188296 A1 | 8/2005 | Masui | |
| 2005/0192802 A1 | 9/2005 | Robinson et al. | |
| 2005/0200913 A1 | 9/2005 | Hohensee et al. | |
| 2006/0088216 A1 * | 4/2006 | Kawamura et al. | 382/187 |
| 2006/0092128 A1 * | 5/2006 | Gao et al. | 345/156 |
| 2006/0126936 A1 * | 6/2006 | Bhaskarabhatla | 382/187 |
| 2007/0189613 A1 * | 8/2007 | Tanaka | 382/229 |
| 2008/0025613 A1 * | 1/2008 | Kumar et al. | 382/189 |
| 2008/0260252 A1 * | 10/2008 | Borgaonkar et al. | 382/189 |
| 2009/0073137 A1 * | 3/2009 | Gao et al. | 345/173 |
| 2009/0207143 A1 * | 8/2009 | Yuan et al. | 345/173 |

FOREIGN PATENT DOCUMENTS

| | | |
|---|---|---|
| CA | 2221045 | 5/1998 |
| CA | 2346391 | 4/2000 |
| CA | 2431105 | 6/2002 |
| DE | 19624987 | 1/1998 |
| EP | 1443438 | 8/2004 |
| JP | 58040684 | 3/1983 |
| JP | 60059471 | 4/1985 |
| JP | 60140461 | 7/1985 |
| JP | 61163463 | 7/1986 |
| JP | 61279986 | 12/1986 |
| JP | 2058115 | 2/1990 |
| JP | 2000099306 | 2/1990 |
| JP | 3147060 | 6/1991 |
| JP | 5028319 | 2/1993 |
| JP | 6096081 | 4/1994 |
| JP | 6111056 | 4/1994 |
| JP | 8006954 | 1/1996 |
| JP | 8036571 | 2/1996 |
| JP | 8083061 | 3/1996 |
| JP | 8146990 | 6/1996 |
| JP | 8167006 | 6/1996 |
| JP | 9114668 | 5/1997 |
| JP | 63317878 | 12/1998 |

| | | |
|---|---|---|
| JP | 11272292 | 7/1999 |
| JP | 2000148757 | 5/2000 |
| JP | 2000347686 | 12/2000 |
| JP | 2002041080 | 2/2002 |
| JP | 2002073601 | 3/2002 |
| JP | 2002082983 | 3/2002 |
| JP | 2002197082 | 7/2002 |
| JP | 2002207557 | 7/2002 |
| JP | 2004199173 | 7/2004 |
| JP | 2005017620 | 1/2005 |
| KR | 2001000673 | 1/2001 |
| TW | 575840 | 2/2004 |
| WO | WO9708629 | 3/1997 |
| WO | WO0190953 | 11/2001 |
| WO | WO0229616 | 4/2002 |
| WO | WO2005059771 | 6/2005 |
| WO | WO2005069159 | 7/2005 |

OTHER PUBLICATIONS

Jennifer Mankoff et al., "Cirrin: A word-level unistroke keyboard for pen input," GVU Center, College of Computing, Georgia Institute of Technology, Atlanta, GA 30332-0280, 1998, ACM.

Andy Cockburn et al., "Evaluating Mobile Text Entry with the Fastaptm Keypad," Department of Computer Science, University of Canterbury, Christchurch, New Zealand, 2003, University of Canterbury.

Ken Perlin., "Quikwriting: Continuous Stylus-based Text Entry," Media Research Laboratory, Department of Computer Science, New York University, 719 Broadway, Rm 1202, New York, NY 10003, 1998, ACM.

Shumin Zhai et al., "The Metropolis Keyboard —An Exploration of Quantitative Techniques for Virtual Keyboard Design," IBM Almaden Research Center, 650 Harry Road, San Jose, CA 95120, 2000, ACM.

David J. Ward et al., "Dasher—A Data Entry Interface Using Continuous Gestures and Language Models," CHI Letters, vol. 2, Issue 2, pp. 129—137, 2000, ACM.

Dan Venolia et al., "T-Cube: A Fast, Self-Disclosing Pen-Based Alphabet," Proceeding CHI '94 Proceedings of the.SIGCHI conference on Human factors in computing systems: celebrating interdependence, pp. 265-270, Apr. 24-28, 1994.

Jacob O. Wobbrock et al., "EdgeWrite: A Stylus-Based Text Entry Method Designed for High Accuracy and Stability of Motion," Human Computer Interaction Institute, School of Computer Science, Carnegie Mellon University, 5000 Forbes Avenue, Pittsburgh, PA 15213 USA, pp. 61-70, 2003, ACM.

Poika Isokoski et al., "Quikwriting as a Multi-Device Text Entry Method," TAUCHI, Department of Computer Sciences, FIN-33014 University of Tampere, Finland, pp. 105-108, Oct. 23-27, 2004.

Bhaskarabhatla, Ajay S, "Experiences in Collection of Handwriting Data for Online Handwriting Recognition in Indic Scripts," Hewlett-Packard Labs, Bangalore, India, Feb. 10, 2005.

Durgesh Rao, "Natural language technology at NCST," National center for Software technology, Mumbai, India, Nov. 2001.

\* cited by examiner

COMPACT STYLUS-BASED INPUT TECHNIQUE FOR INDIC SCRIPTS

TECHNICAL FIELD OF THE INVENTION

The present invention relates generally to a user interface in a computer system, and more particularly relates to inputting Indic scripts into a handheld device.

BACKGROUND OF THE INVENTION

In the modern world, computing devices are getting smaller, more powerful, and cheaper to produce. These small mobile devices require text input devices that are not quite as cumbersome as keyboards. Miniature keyboards and soft keyboards are available on small handheld devices, such as personal digital assistants (PDAs), but are only practical for small data entry operations. Further, current techniques adopted by many telecommunication companies overload each key of a typical phone keypad with as many as 4-6 symbols, which requires cycling through the range of symbols to enter a single vowel, consonant, and/or a modifier. In general, such keyboards use up valuable real estate on these devices and are difficult to use. Users who are less-literate and not computer proficient generally find the conventional keyboards to be the most intimidating parts of these computing devices.

Conventional ways for inputting phonetic scripts, such as Indic, Sinhalese, Burmese, Thai, Vietnamese, and the like typically include one or more of the following techniques:

First, as described above data entry into computers is performed using keyboards. The complexity and size of keyboards depend on the number and type of characters present in a script. Typically, phonetic scripts tend to have large and/or complex character sets. Such scripts can present great difficulties in the design as well as use of these keyboards. For example, Indic scripts have nearly 30 to 40 consonants, 12 to 15 vowels, and about 12 to 15 phonetic modifiers and half consonant modifiers. As a result, the current techniques employ either overlays on a QWERTY keyboard, such as Inscript where several key strokes may be required to enter a desired syllable. The keyboard approach provides incomplete visibility of the entire character map at any given point of time. In addition, these keyboards are non-intuitive and can require extensive practice period for proficiency. Further, character entries using such keyboards tend to be very slow. Furthermore, the increasing demand for smaller and smaller devices, such as PDAs and mobile phones is driving keyboard designs toward a smaller keypad, making it impractical to use keyboards accommodating such large character sets.

Second, a technique called Simpli is based on a soft keypad activated using a stylus. Phonetically related characters (consonants/modifiers) are grouped into layers and become dynamically available when the group-leader character is accessed or touched. However, this technique requires the user to first recollect the group of the desired character and further requires recollecting the leader of the group. Third, the Gesture Keyboard facilitates in resolving the above problems, but requires peripheral devices and considerably large display or digitizer real estate to display all of the base consonants and vowels.

There are other input techniques for scripts, such as Roman. However, these techniques work when the number of symbols is small, and do not leverage the syllabic structure of Indic scripts. There are many other conventional techniques for Oriental scripts, such as Japanese, Chinese, and the like. However, these scripts have significantly large number of symbols and do not have any syllabic structure. Therefore, these techniques do not reflect or leverage the mental models of a user of syllabic scripts.

There are also many handwriting inputting techniques as an alternative input technique for scripts, such as Roman and Oriental, and are available on PDAs and mobile phones. However, the corresponding recognition technology is in its infancy for applying them to Indic scripts. These techniques are not yet reliable enough to support unconstrained handwriting input of hundreds of syllabic characters that are present in scripts, such as Indic scripts.

SUMMARY OF THE INVENTION

According to an aspect of the subject matter, there is provided a method for syllabic character entry into a handheld device comprising the steps of drawing a desired base syllabic character using a stylus in a writing area on a syllabic level user interface disposed on the handheld device, determining whether a modifier is needed to the drawn desired base syllabic character, if so, inputting associate data of a desired modifier along with the drawn desired syllabic character to a base syllabic character recognizer by tapping on a desired one of modifiers that are disposed substantially around the writing area of a modifier panel, producing a candidate syllabic character by the base syllabic character recognizer upon recognition of the associated data, and displaying the produced candidate syllabic character using a first contrasting color in a progressive display panel.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "base syllabic character" refers to an isolated vowel, consonant, half-consonant or special consonant conjunct symbol. The "base syllabic character" may also include an English character, roman character, and/or numerals. The term "syllabic character" refers to a base syllabic character modified by one or more consonant and vowel modifiers. The term "word" refers to one or more syllabic characters.

Figure 1:
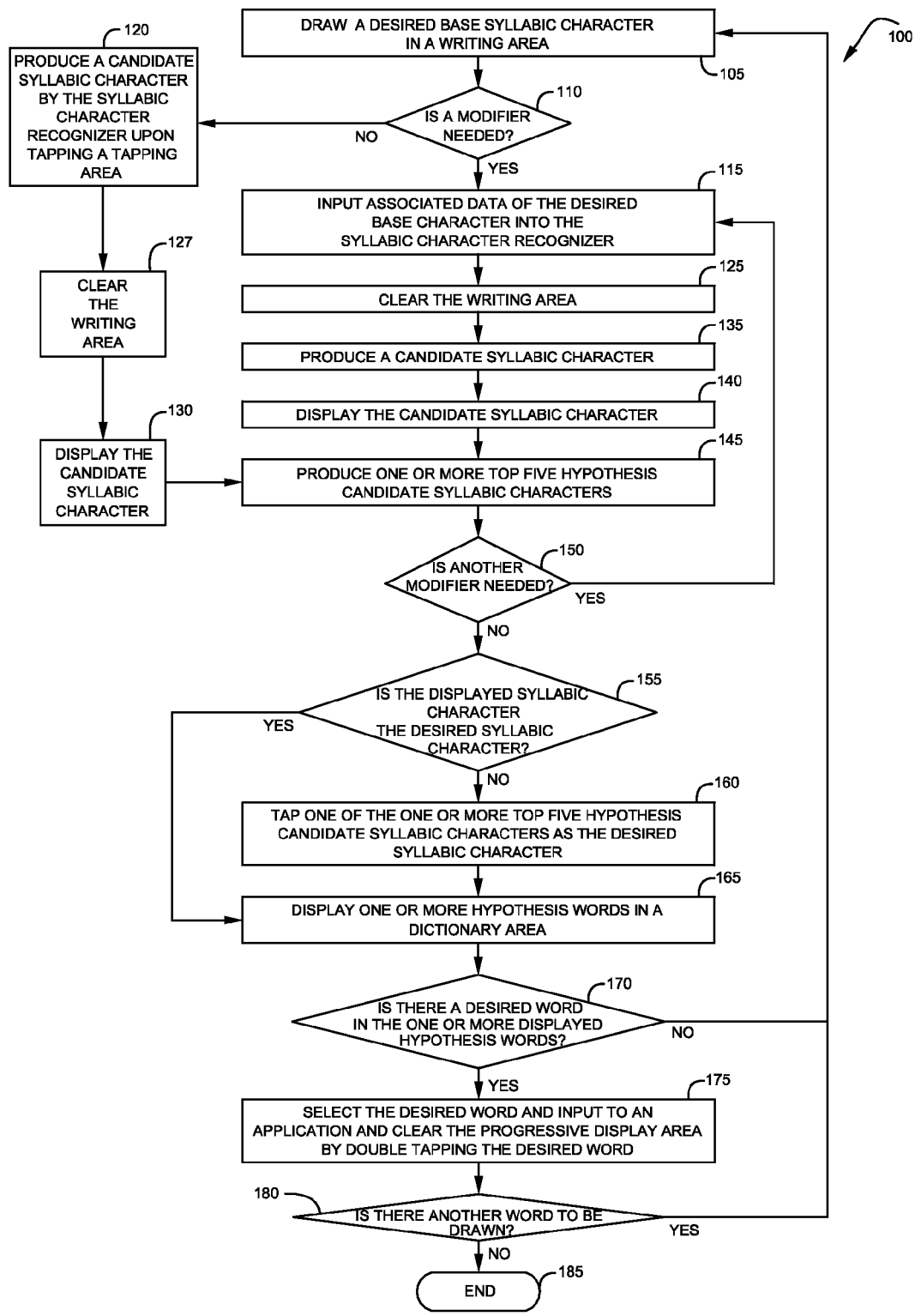
FIG. 1 is a flowchart illustrating an example method of stylus based inputting of syllabic characters into a computer according to an embodiment of the present subject matter.

FIG. 1 illustrates an example method 100 for inputting Indic scripts, such as Devanagari (used for languages, such as Hindi, Marathi, and the like) into a computer. At step 105, this example method 100 begins by drawing a desired base syllabic character using a stylus into a writing area disposed in a syllabic level user interface on a handheld device.

Figure 2:
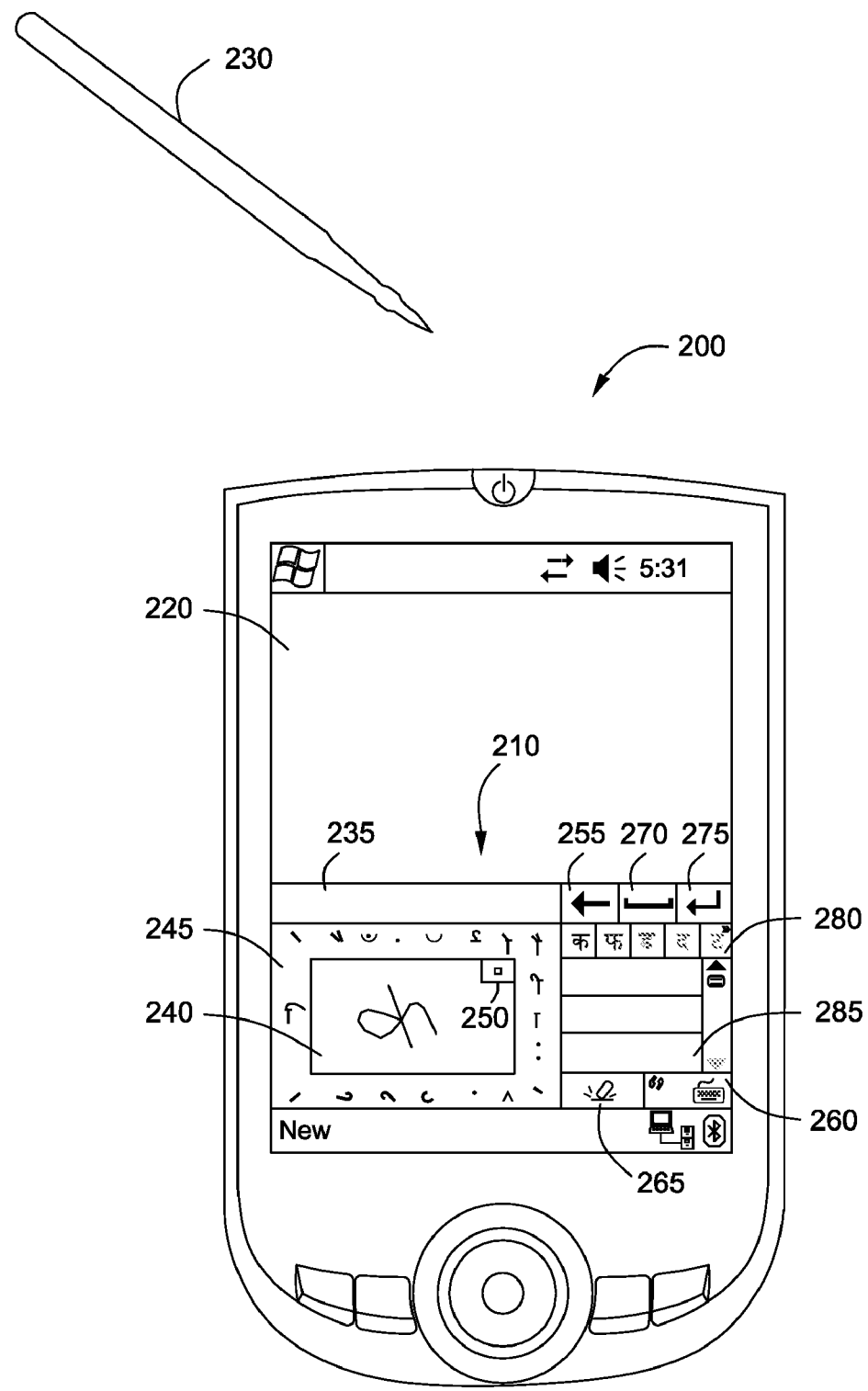
FIG. 2 is an example modifier panel used for inputting syllabic characters in a handheld device screen according to an embodiment of the present subject matter.

Referring now to FIG. 2, there is shown an example handheld device 200 including a syllabic level user interface 210 for inputting syllabic characters into an application. As shown in FIG. 2, the handheld device 200 further includes an application display area 220 and a stylus 230. Further as shown in FIG. 2, the syllabic level user interface 210 includes a progressive display panel 235, a writing area 240, modifiers 245 displayed substantially surrounding the writing area 240, a tapping area 250, a backspace button 255, a space button 270, a clear button 265, a special character button 260, an enter button 275, a symbol correction panel 280, and a dictionary area 285. The special character button 260 can be a soft key board button. The soft keyboard button 260 can be used to enter special characters that are not included in the base syllabic characters. In some embodiments, tapping the soft keyboard button 260 displays a soft keyboard in the syllabic level user interface 210 for entering English characters and numerals.

Figure 3:
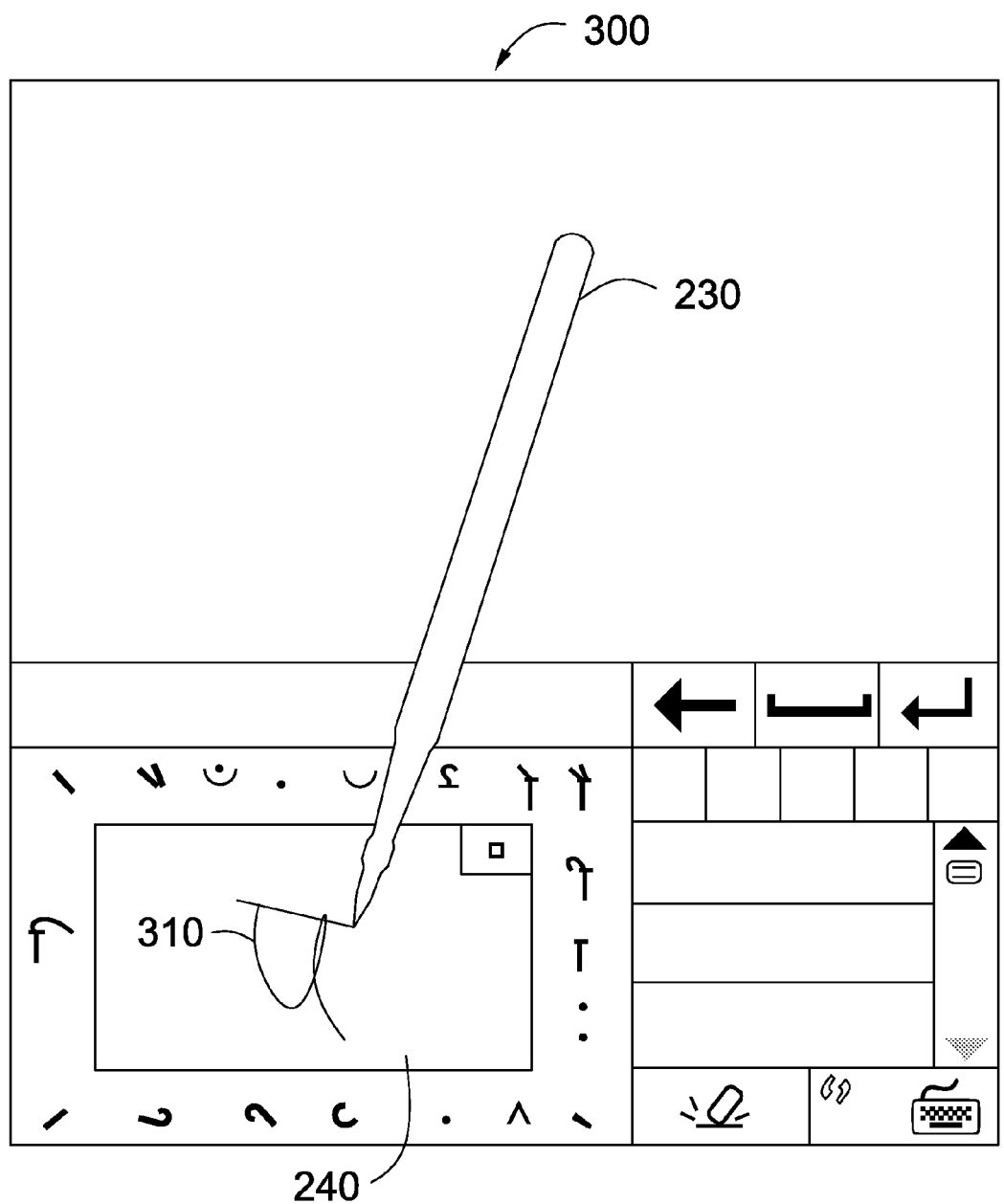
FIGS. 3-17 are screen shot representations that illustrate a sequence of syllable inputs performed to form a word according to an embodiment of the present invention.

Referring now to FIG. 3, it can be seen how a user draws a desired base syllabic character 310 in the writing area 240 of a syllabic level user interface 210 using the stylus 230. In these embodiments, the writing area 240 consists of a box in the syllabic level user interface 210 within which a user writes each desired base syllabic character.

Figure 4:
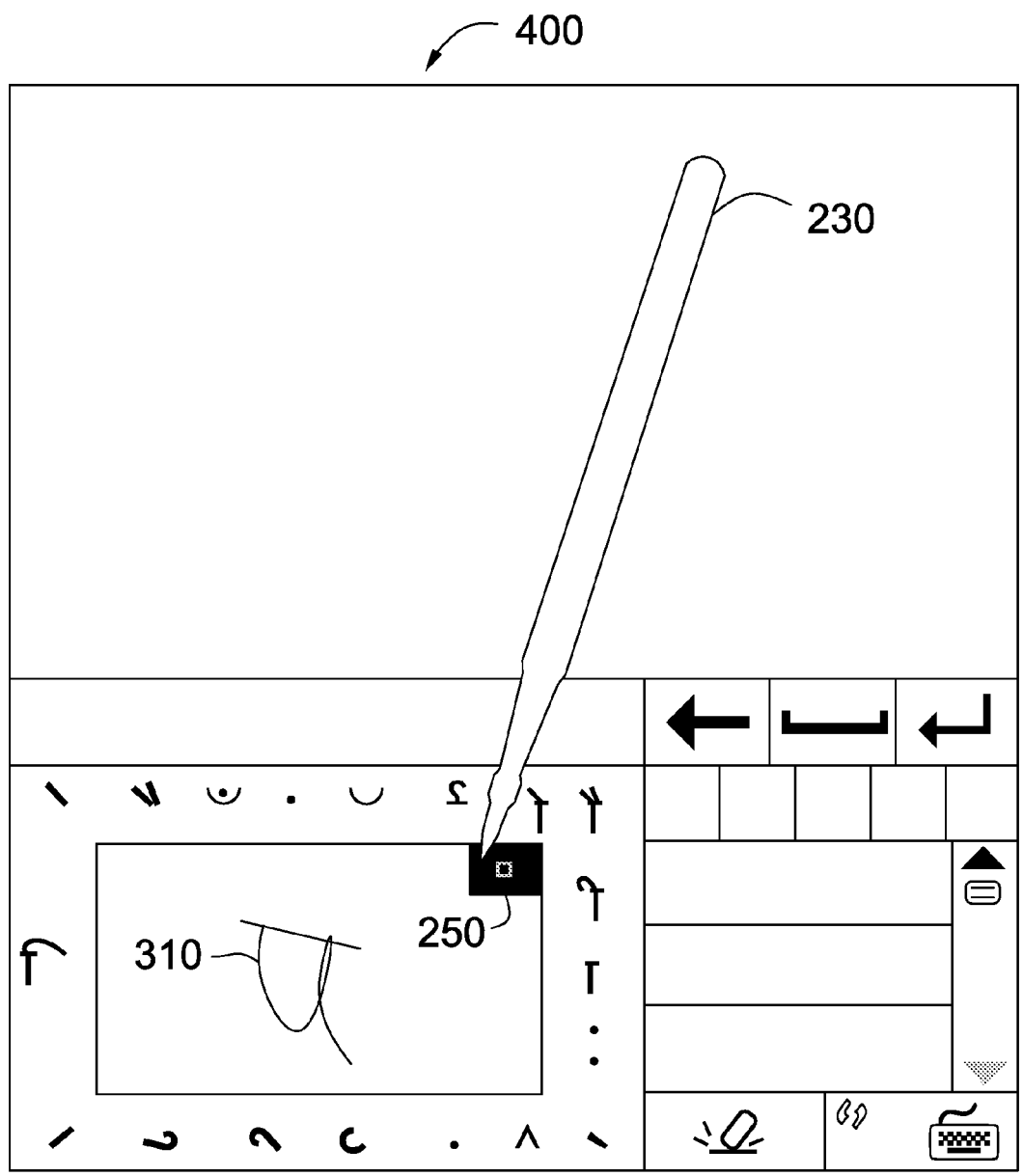
Figure 5:
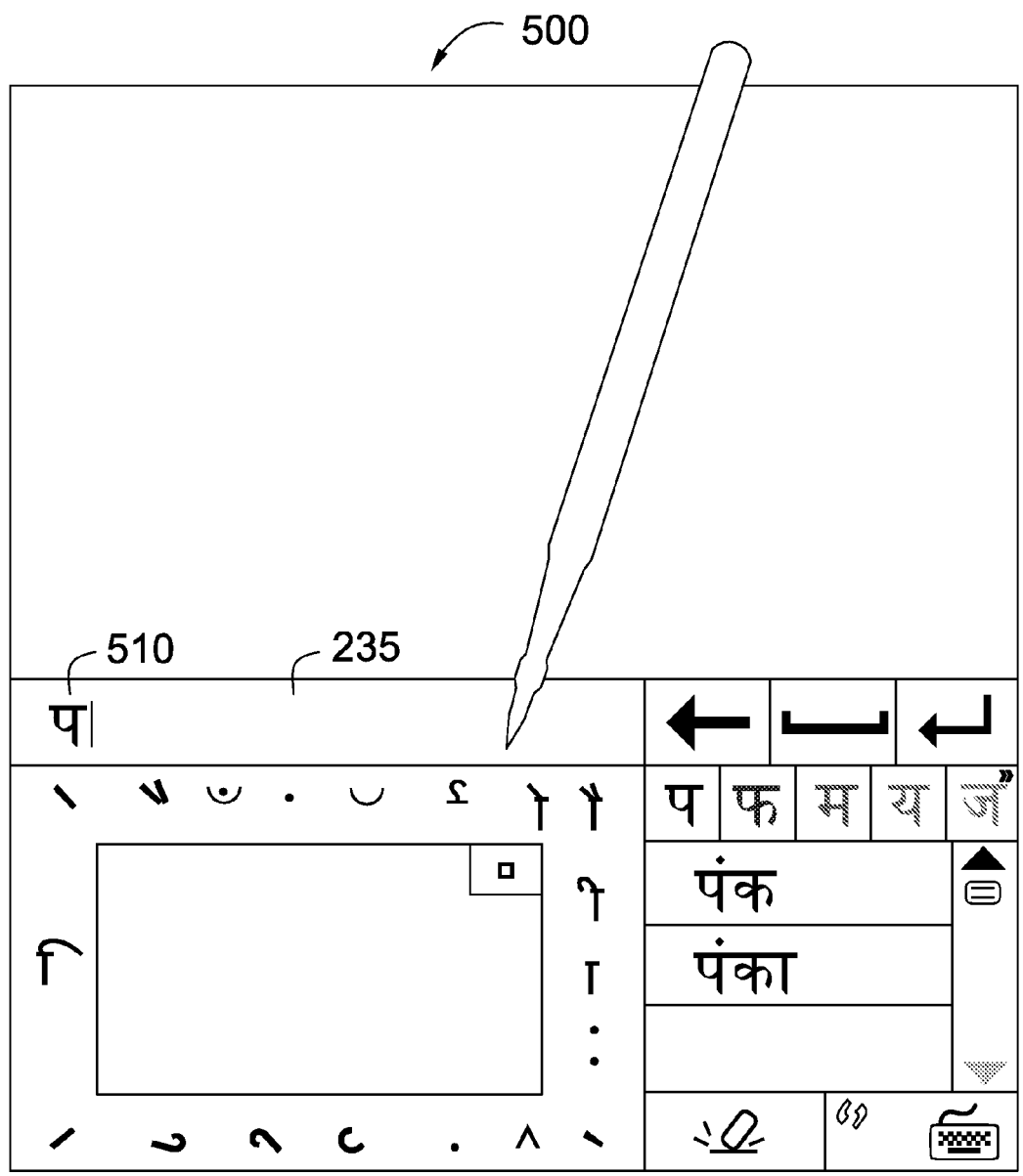

At step 110, a determination is made as to whether a modifier is needed to the drawn base syllabic character. Based on the determination at step 110, if the modifier is not needed to the drawn base syllabic character, then the method 100 goes to step 120. At step 120, a candidate syllabic character is produced by the base syllabic character recognizer upon tapping a tapping area located in the writing area and inputting the associated data into the base syllabic character recognizer. At step 127, the writing area is cleared upon tapping the tapping area. At step 130, the produced candidate syllabic character is displayed in a progressive display area of the syllabic level user interface in a first contrasting color. Referring now to FIGS. 3 and 4 it can be seen how a user can draw the desired base syllabic character 310 and tap the tapping area 250 and input the associated data of the desired base syllabic character into a base syllabic character recognizer and produce a candidate syllabic character. Referring now to FIG. 5, it can be seen how the candidate syllabic character 510 is displayed in the progressive display panel 235 of the syllabic level user interface 210. In these embodiments, the progressive display panel 235 displays the candidate syllabic character 510 along with any tapped modifiers in a first contrasting color. Further in these embodiments, the progressive display panel 235 displays previously entered syllabic characters before the current displayed candidate syllabic character to facilitate the user in a desired word formation. The progressive display panel provides necessary visual feedback and reduces user visual disconnect between the syllabic level user interface 210 and the application display area 220 (shown in FIG. 2).

Based on the determination at step 110, if a modifier is needed then the method 100 goes to step 115. At step 115, associated data of the drawn desired syllabic character is inputted into a base syllabic character recognizer by tapping on a desired one of the modifiers that are disposed substantially around the writing area of the modifier panel. In some embodiments, the modifiers are disposed substantially around the writing area such that they an intuitive feeling of drawing a syllable to a user. At step 125, the writing area is cleared upon tapping on the desired one of the modifiers.

Figure 6:
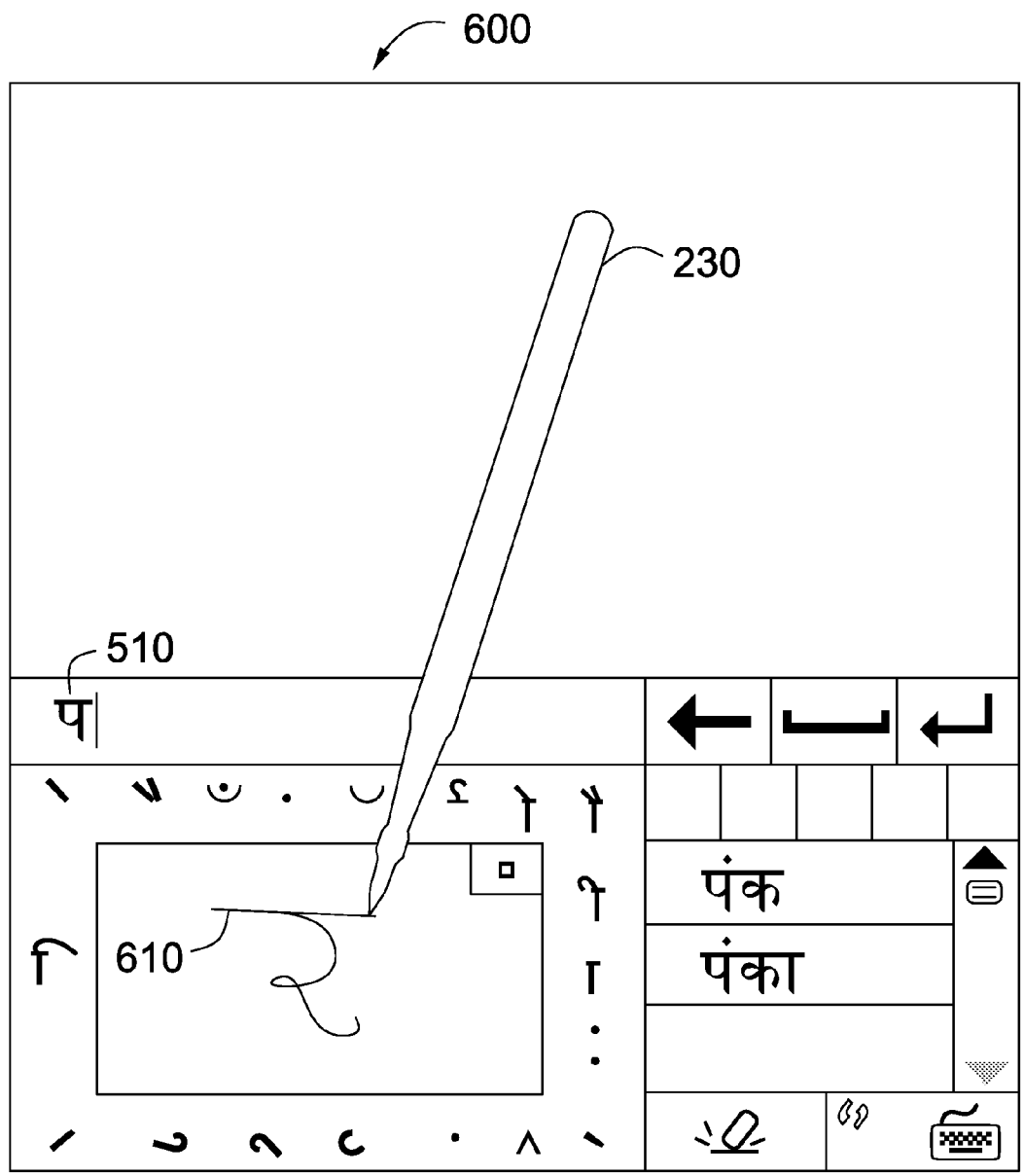
Figure 7:
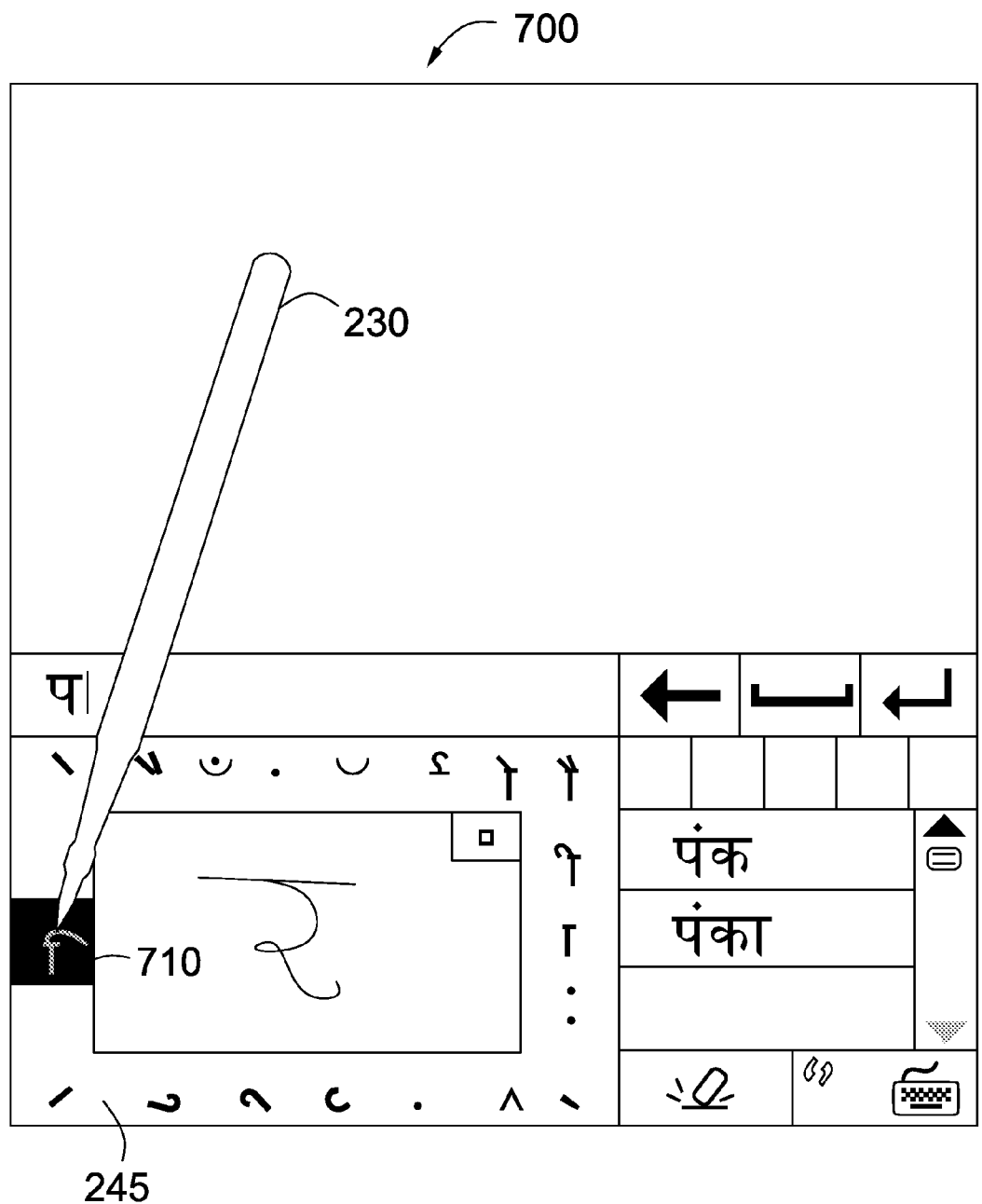

Referring now to FIGS. 6 and 7, it can be seen how a user can draw a desired base syllabic character 610 in the writing area 240 (shown in FIG. 2) the stylus 230 and tap a desired modifier 710 that is located substantially around the writing area 245 and input associated data of the base syllabic character 610 into the base syllabic character recognizer. In these embodiments, the modifiers substantially surround the writing area 245. The modifiers are displayed in their natural expected positions associated with a drawn base syllabic character to reduce seek time. The modifiers may be disposed around the writing area such that they are in their natural positions to a desired base syllabic character. In these embodiments, the arrangement of the modifiers around the writing area 245 coincides with a user's mental model. For example, if a user writes a consonant "k"and wants to add a modifier that appears in the lower region of "k", then the user can search through the modifiers displayed in the lower region of the writing area 245 and then tap a desired modifier, such as "u " to form a character "ku". This process of adding a modifier to the base syllabic character mimics a natural writing order of writing a base syllabic character followed by writing one or more desired modifiers. It can be envisioned, that in cases where the display area is a premium, the one or more modifiers can be displayed upon activating a special modifier button that may be provided in the syllabic level user interface.

Figure 8:
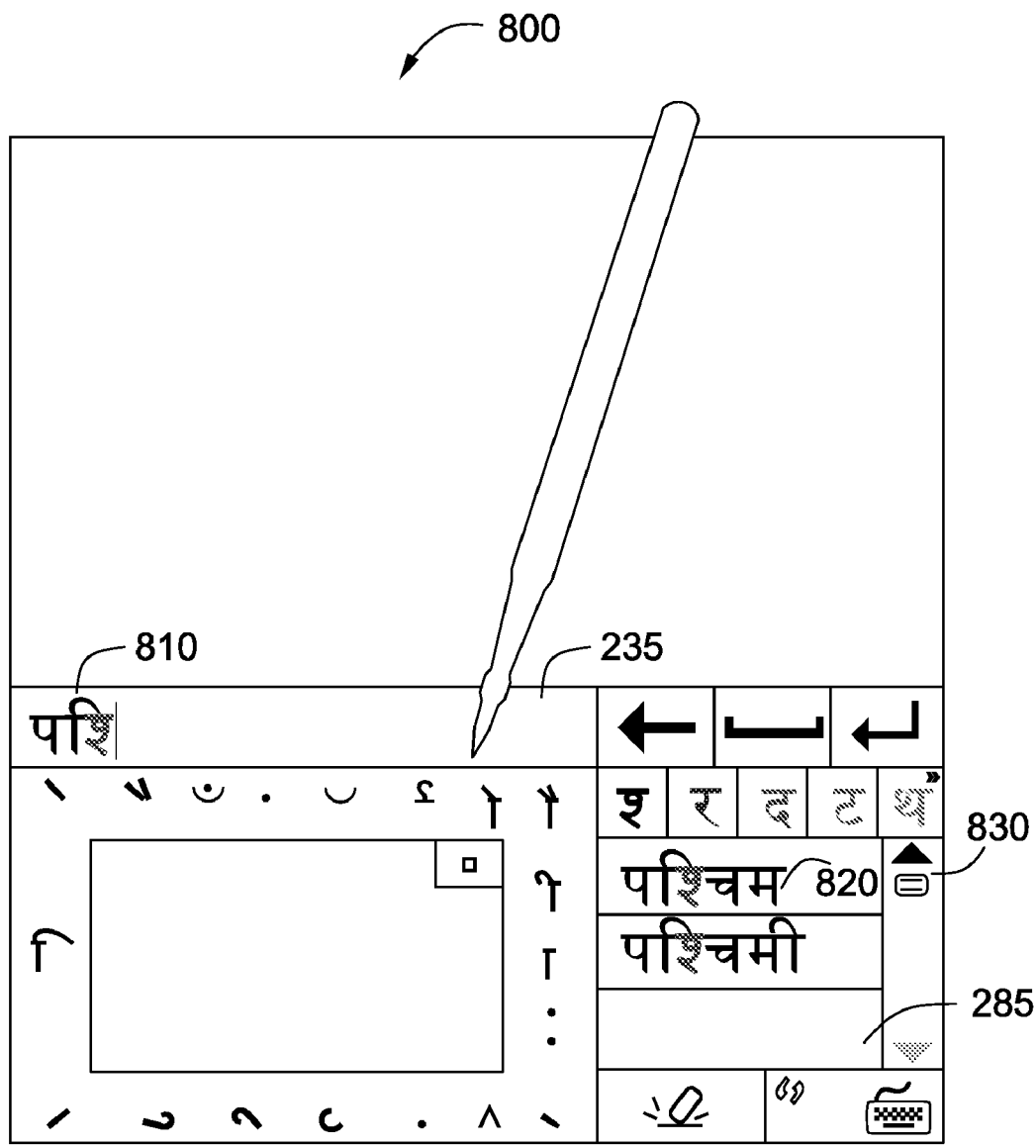

At step 135, a candidate syllabic character is produced by the base syllabic character recognizer upon tapping the tapping area and recognition of the associated data. At step 140, the produced candidate syllabic character is displayed using a first contrasting color in the progressive display panel. Referring now to FIG. 8, it can be seen how the candidate syllabic character 810 is displayed in the progressive display panel 235 upon producing the candidate syllabic character.

At step 145 one or more top five hypothesis candidate syllabic characters are produced.

At step 150, a determination is made as to whether another modifier is needed to the produced candidate syllabic character. Based on the determination at step 150, the method 100 goes to step 115 and repeats steps 115-150 to produce and display a candidate syllabic character including another modifier if another modifier is needed. Based on the determination at step 150, the method 100 goes to step 155 if another modifier is not needed. In some embodiments, the one or more top five hypothesis candidate syllabic characters includes displaying a first and second top five hypothesis candidate syllabic characters in a symbol correction panel. In some embodiments, the above steps 115-150 are repeated until a desired syllabic character including multiple modifiers is formed on the progressive display area. In these embodiments, the symbol correction panel displays a top five choices of consonant or vowel returned by the base syllabic character recognizer that typographically resemble the drawn syllabic character by a user. The symbol correction panel facilitates the user to correct displayed candidate syllabic character in a single step by selecting and tapping a desired candidate in the displayed next five choices of consonant or vowel.

At step 155, the method 100 determines whether the displayed syllabic character is the desired syllabic character. Based on the determination at step 155, the method 100 goes to step 160 if the displayed syllabic character is not the desired syllabic character and taps one of the one or more top five hypothesis candidate syllabic characters displayed in the symbol correction panel as the desired syllabic character. In some embodiments, a determination is made as to whether any one of the displayed first top five hypothesis candidate base syllabic characters is the desired base syllabic character. A desired one of the first top five hypothesis candidate syllabic characters displayed in the symbol correction panel is then tapped using the stylus if one of the displayed first top five hypothesis candidate base syllabic characters is the desired base syllabic character.

Figure 9:
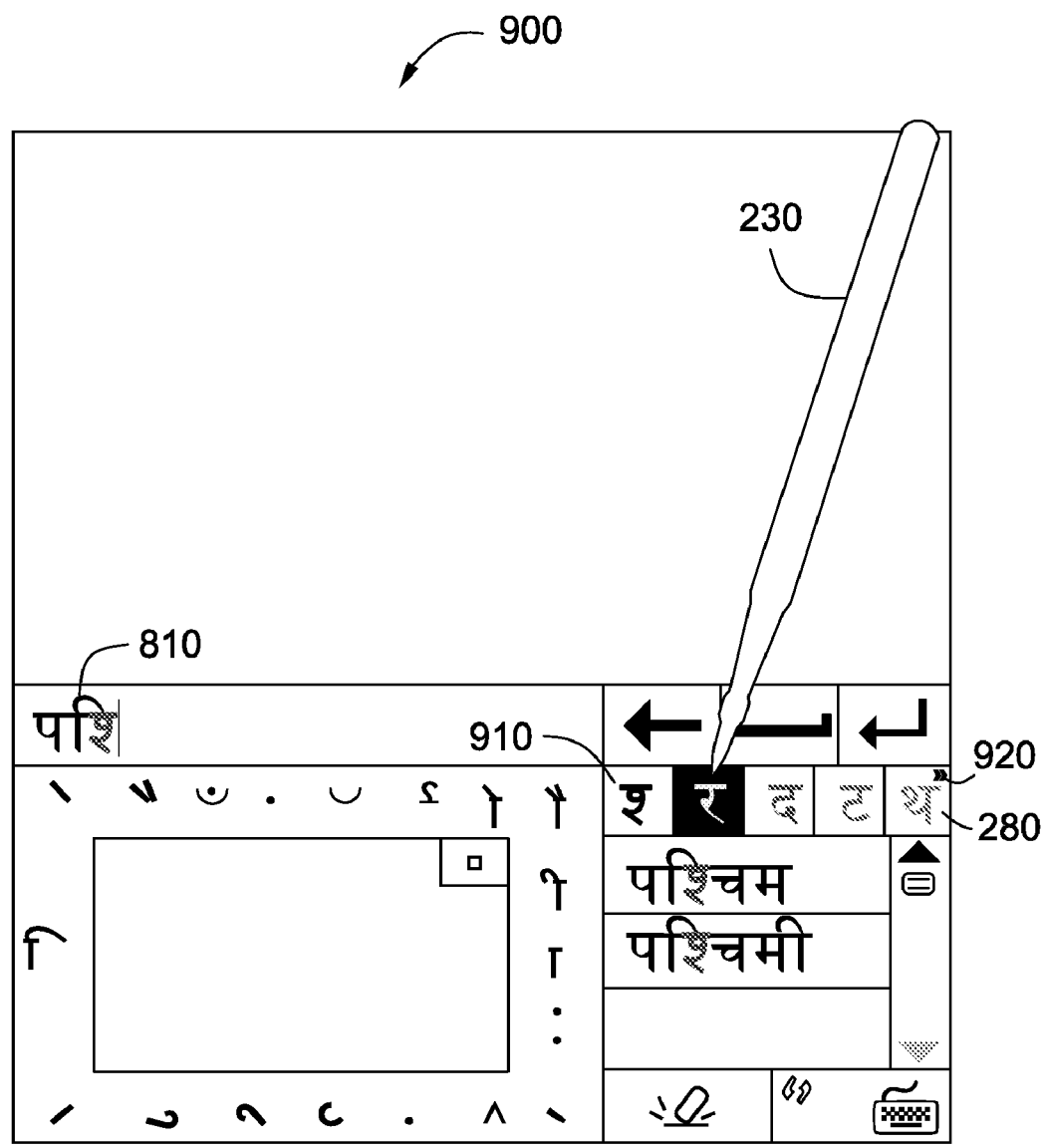
Figure 10:
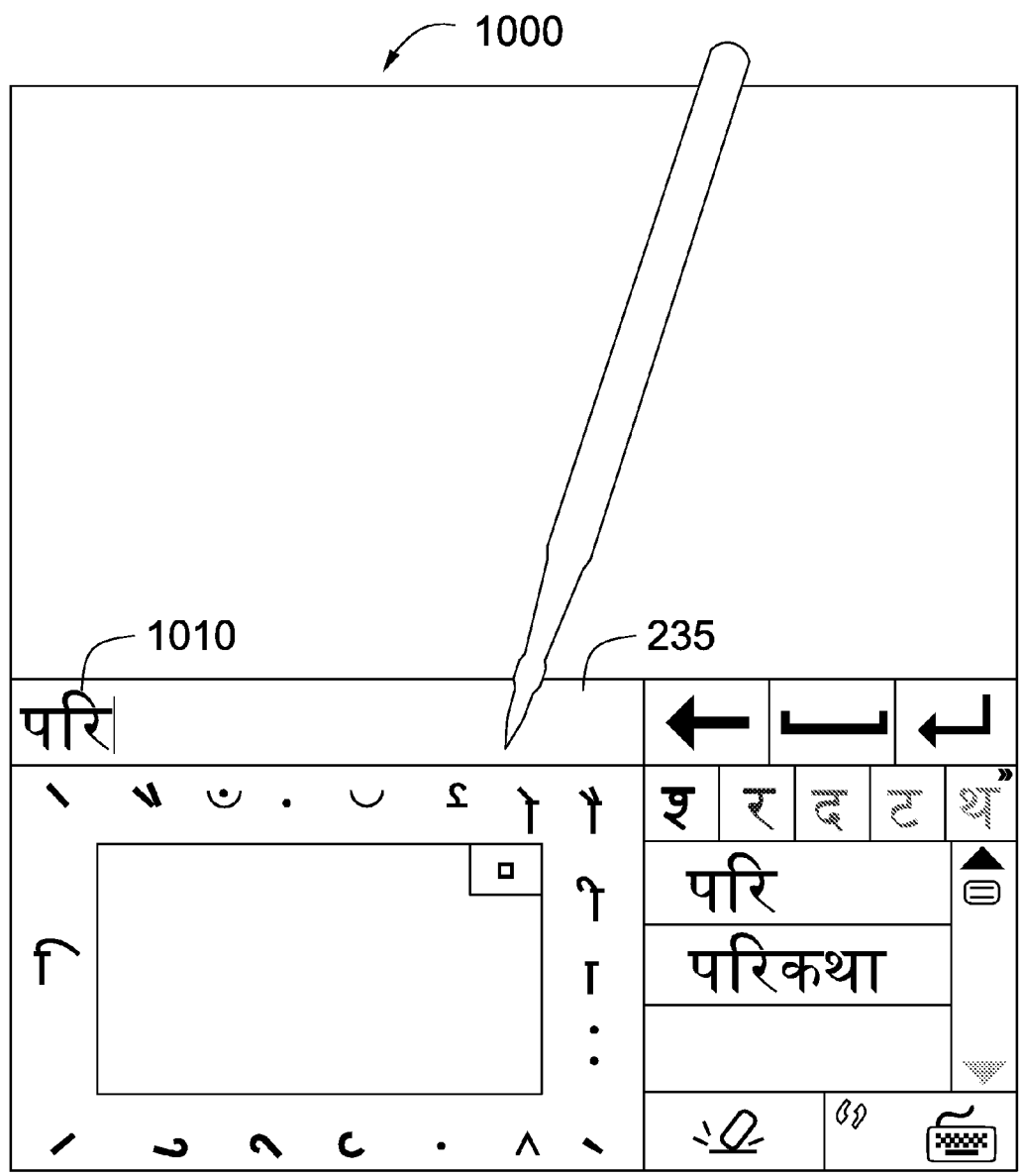
Figure 11:
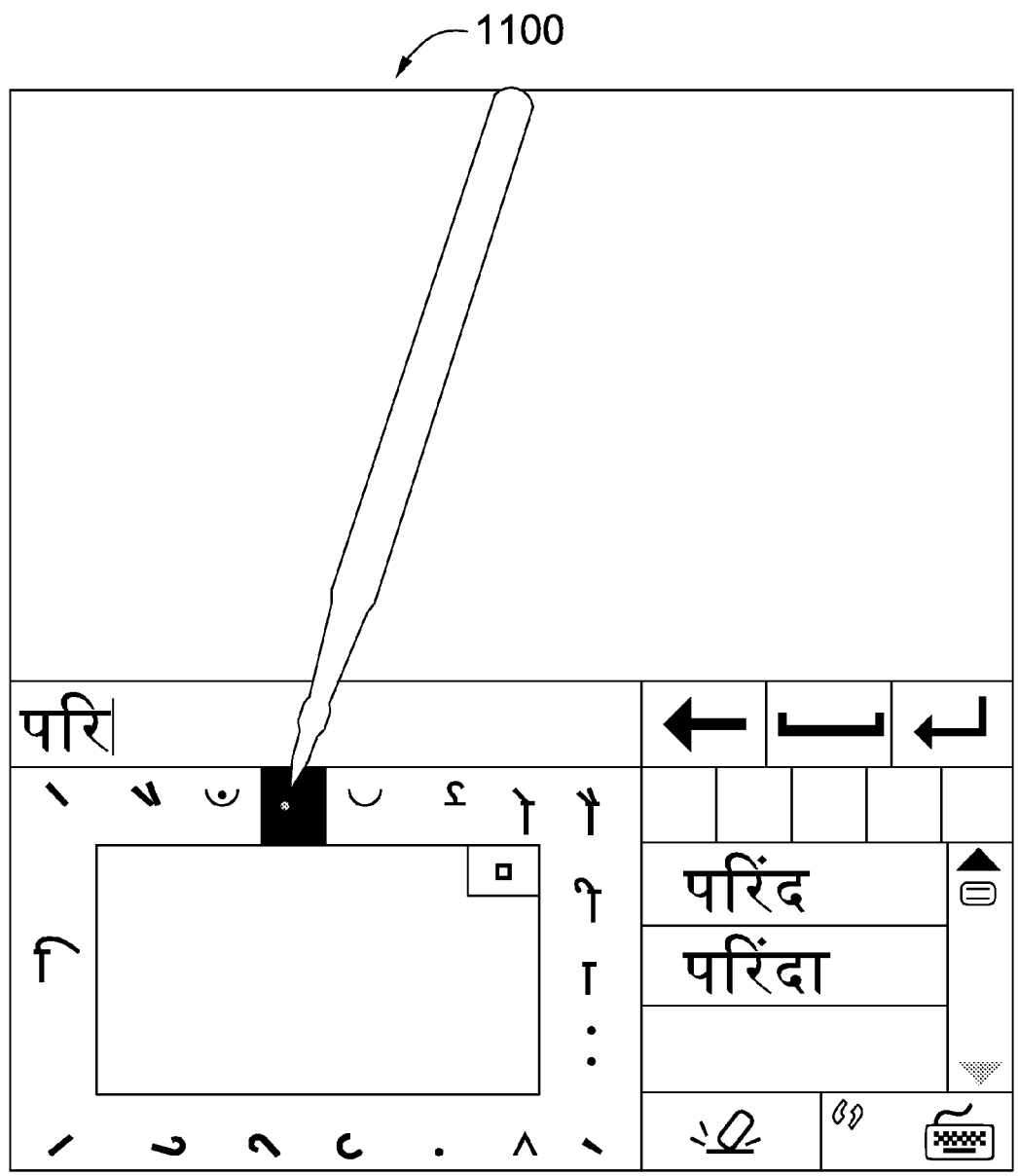
Figure 12:
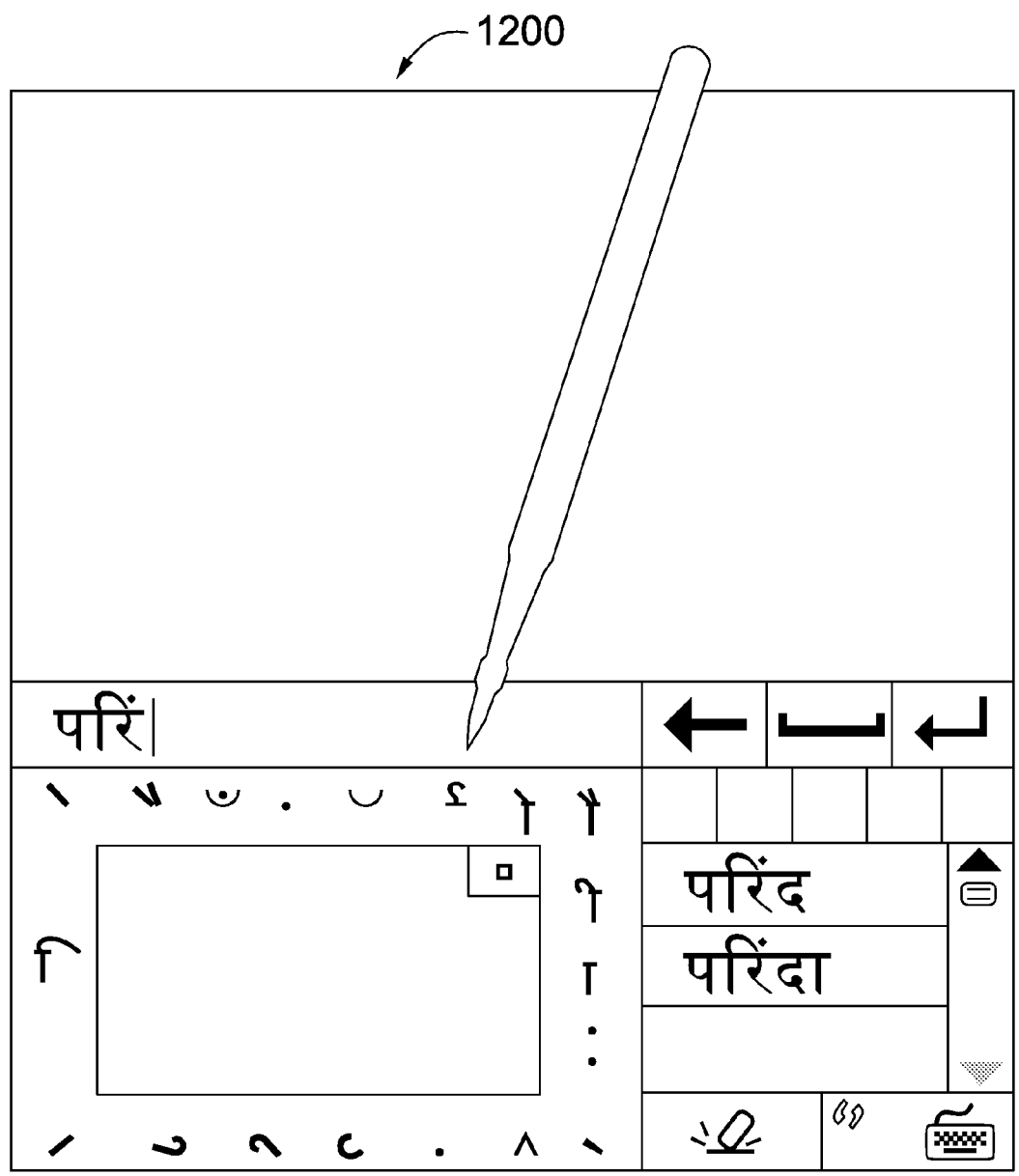
Figure 13:
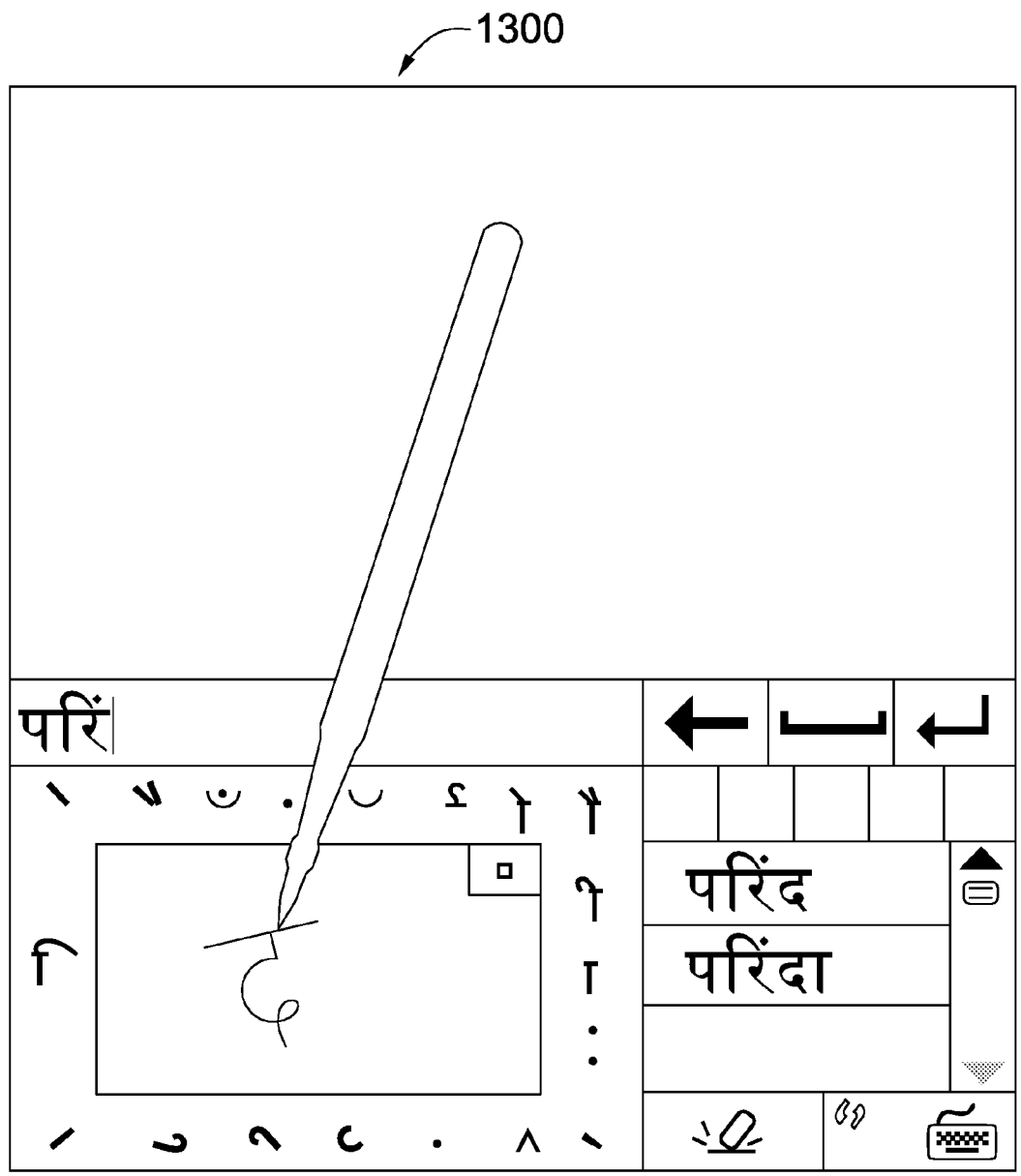
Figure 14:
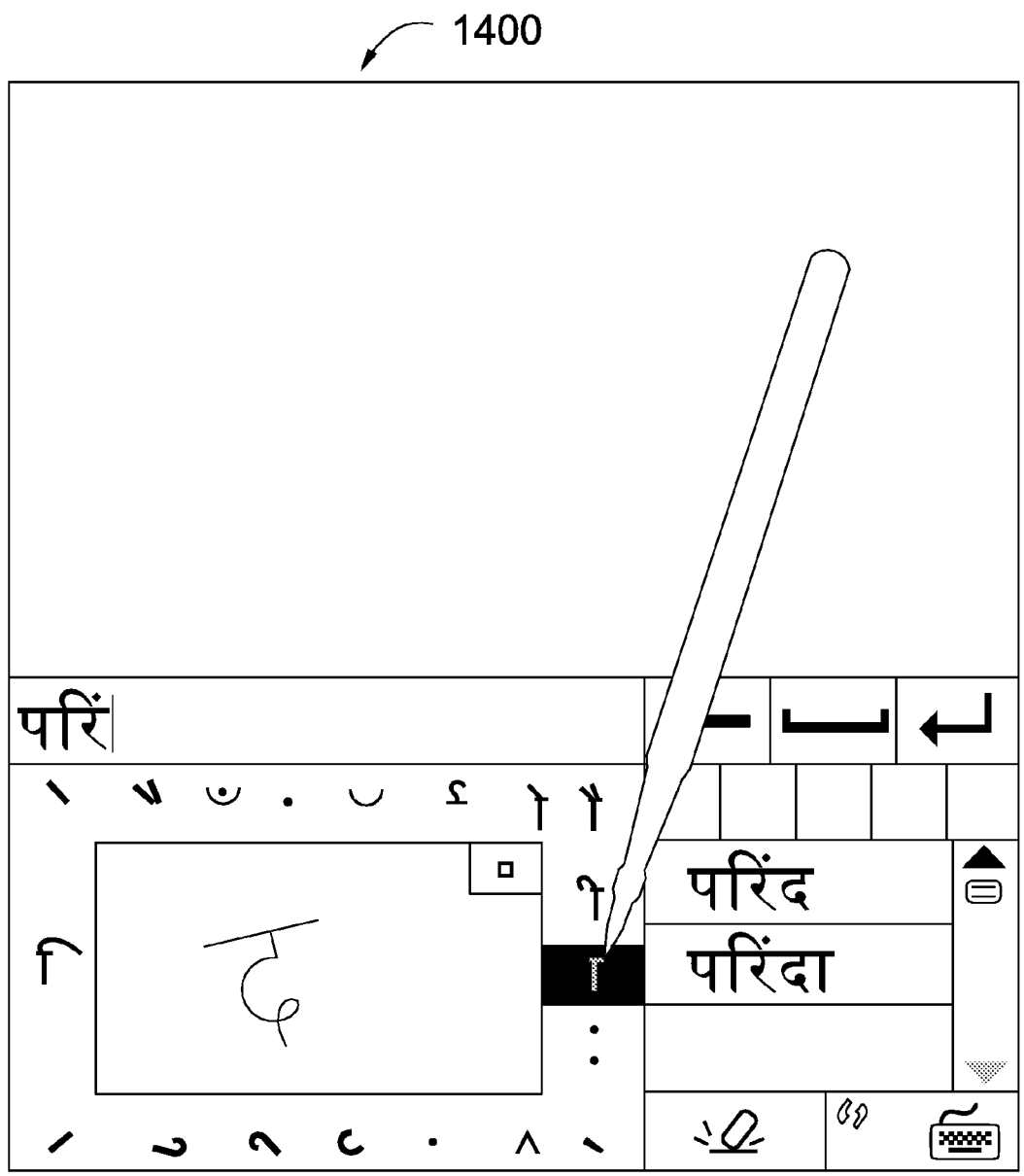
Figure 15:
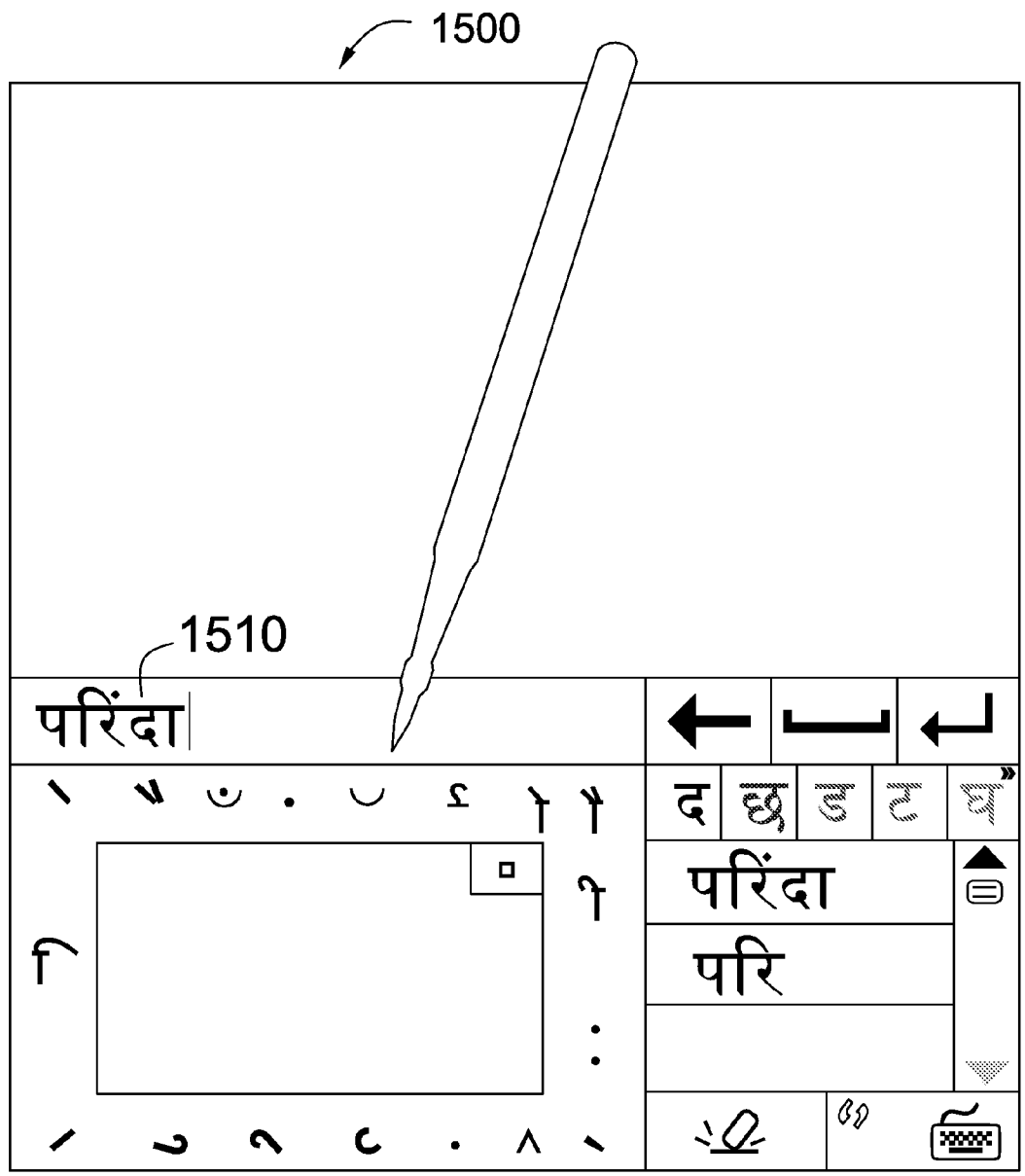

In these embodiments, a next hypothesis candidate button located in the top right hand corner of the symbol correction panel is tapped to display a second top five hypothesis candidate base syllabic characters in the symbol correction panel. A determination is made as to whether any one of the displayed second top five hypothesis candidate base syllabic character is the desired base syllabic character. A desired one of the second top five hypothesis candidate syllabic characters displayed in the symbol correction panel is then tapped using the stylus if one of the displayed second top five hypothesis candidate base syllabic characters is the desired base syllabic character. Referring now to FIGS. 9 and 10, it can be seen how a user can tap a desired one of the top five hypothesis candidates 910 displayed in the symbol correction panel 280 using the stylus 230 and display the desired base syllabic character 1010 incase the displayed candidate syllabic character 810 is not the desired syllabic character. As shown in FIG. 9, the top five hypothesis candidates 910 may be displayed in a progressive contrast color to indicate the order of hypothesis from left to right of the symbol correction panel 280. Also it can be seen in FIG. 9, that a user can tap the next hypothesis candidate button 920 located in the top right hand corner of the symbol correction panel 280 to display a next top five hypothesis candidate base syllabic characters in case the desired syllabic character is not in the first top five hypothesis candidate base syllabic characters displayed in the progressive display panel 235.

At step 165, one or more hypothesis words are displayed in a dictionary area located within the syllabic level user interface upon inputting the associated data of the drawn base syllabic character. At step 170, the method 100 determines whether there is a desired word in the one or more displayed hypothesis words. Based on the determination at step 170 the method 100 goes to step 115 and repeats steps 115-170 if there is no desired word in the displayed one or more hypothesis words in the dictionary area. Based on the determination at step 170 the method 100 goes to step 175 and selects one of the displayed one or more hypothesis words if there is a desired word in the displayed one or more hypothesis words in the dictionary area by double tapping the desired word. In some embodiments, the displayed one or more hypothesis words are selected by tapping on the desired one of the one or more hypothesis words displayed in the dictionary area.

Referring now to FIG. 8, it can be seen how one or more hypothesis words 820 are displayed in the dictionary area 285 upon inputting the associated data of the drawn one or more base syllabic characters 810. In some embodiments, the dictionary area 285 has 5 top choices returned from a dynamic search of a dictionary based on a partial word input. As shown in FIG. 8, 3 out of the 5 top choices are visible in the dictionary area 285 and the remaining 2 choices can be seen by tapping a scroll button 830 located on the right side of the dictionary area 285. The top five hypothesis words contained in the dictionary area 285 is updated upon entry of each base syllabic character and/or a modifier into the writing area. Further in these embodiments, the contents in the dictionary database are appended each time a new word is entered. The selection from the displayed top five hypothesis words speeds-up the data entry process. The top 5 hypothesis words may be driven by frequency of occurrence in a language.

Figure 16:
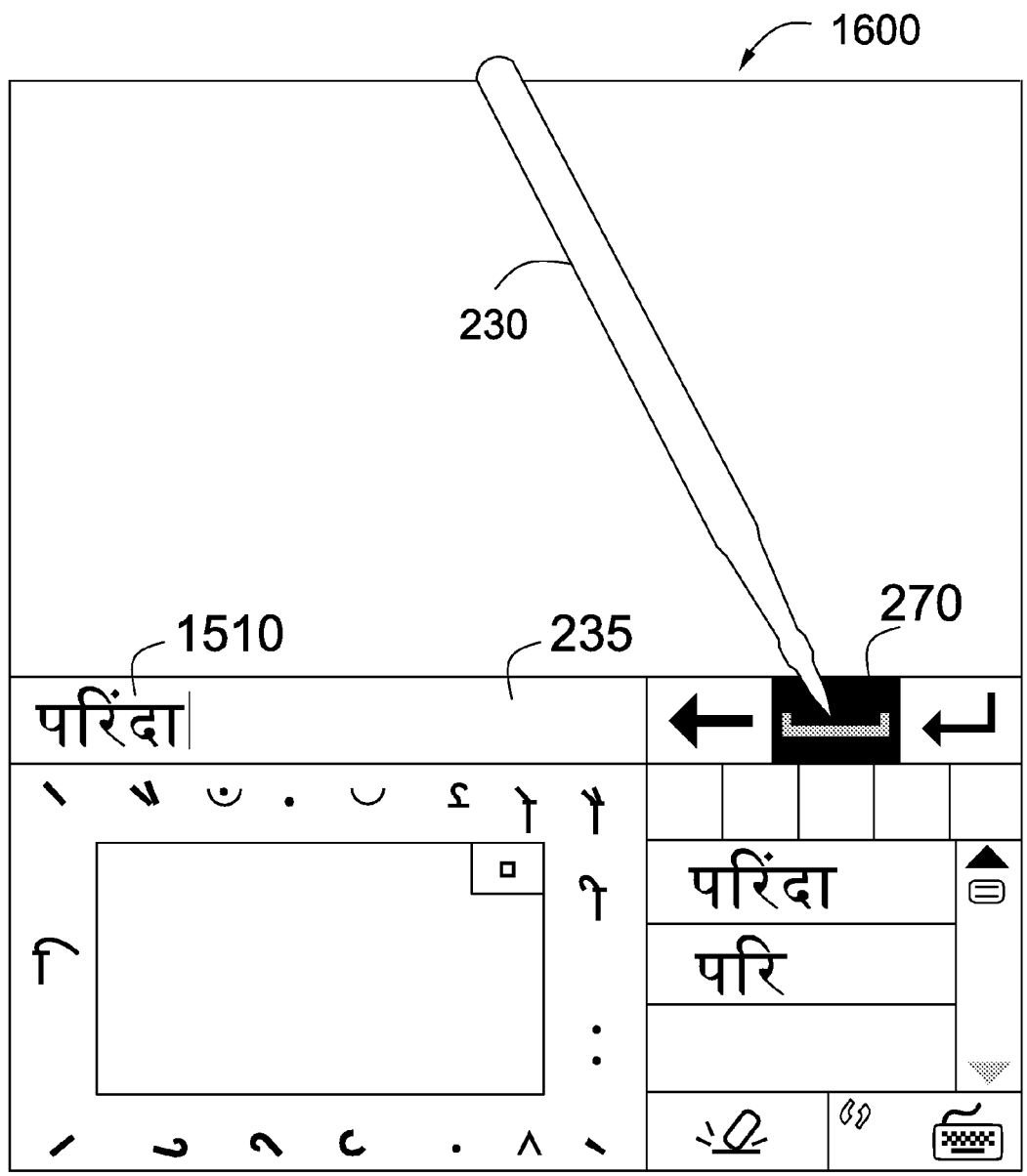
Figure 17:
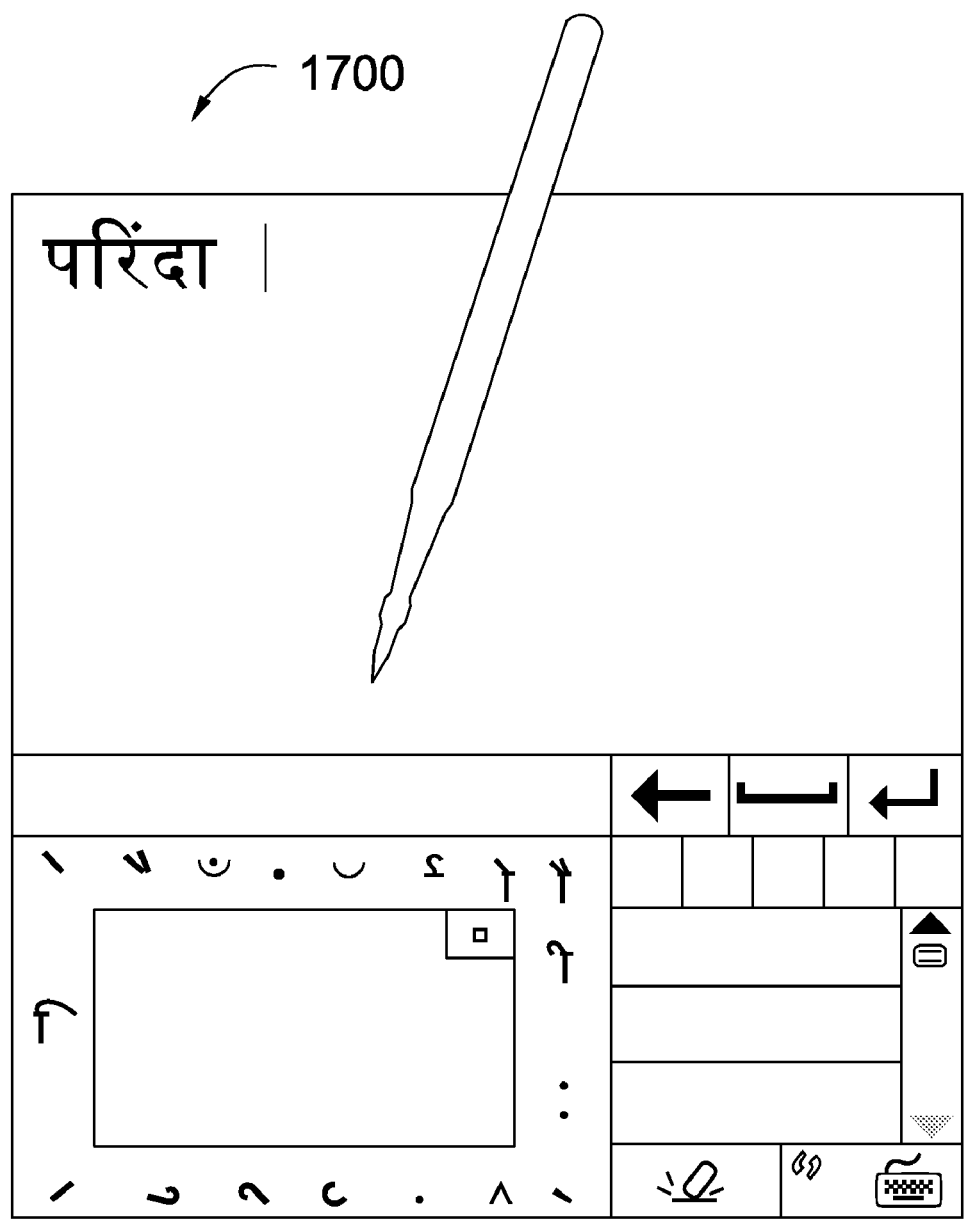

Referring now to FIGS. 11-15, the screen shots sequentially show the drawing and entering of the rest of the desired base syllabic characters along with the associated modifiers to form the desired word 1510. Referring now to FIG. 16, the screen shot shows inputting the formed word 1510 displayed in the progressive display area 235 into the application display area 220 (as shown in FIG. 2) by tapping a space button 270 provided in the upper panel area of the syllabic level user interface 210 using the stylus 230. Referring now to FIG. 17, it can be seen the formed word 1510 is cleared from the progressive display area 235 and moved to the application display area 220 (as shown in FIG. 2) upon inputting the formed word 1510 by tapping the space button 270.

At step 180, the method 100 determines if there is another word that needs to be entered into the handheld device. Based on the determination at step 180 the method 100 goes to step 105 and repeats steps 105-185 if there is another word that needs to be entered into the handheld device. Based on the determination at step 180 the method 100 goes to step 185 and stops the above-described syllabic character entry process if there is no other word that needs to be entered into the handheld device.

Although the flowchart 100 includes steps 110-185 that are arranged serially in the exemplary embodiments other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Although the embodiments of the present invention are described in the context of non-distributed environment they can be very much implemented in the distributed environment as well.

Various embodiments of the present subject matter can be implemented in software, which may be run in the environment shown in FIG. 18 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 18:
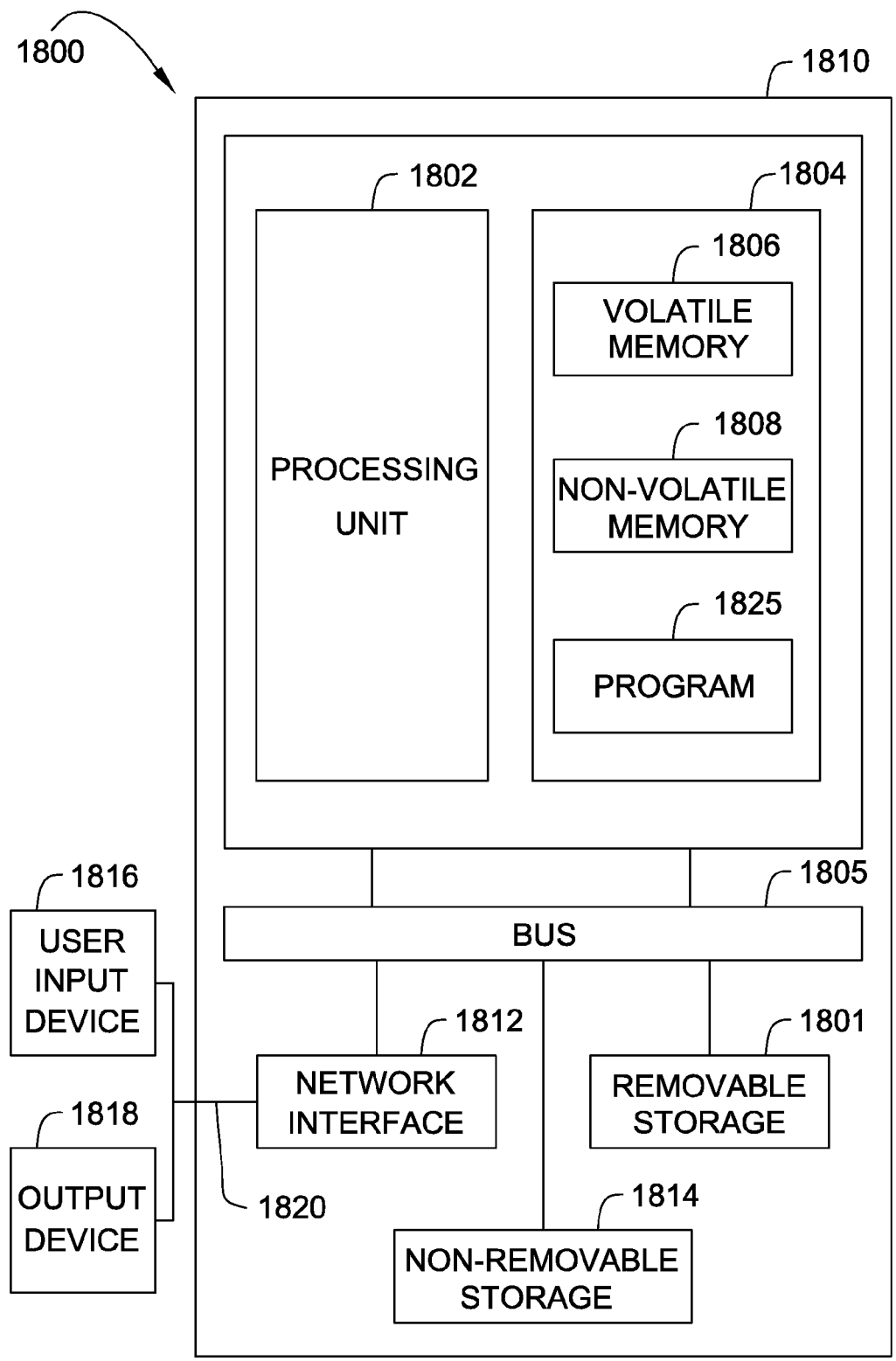
FIG. 18 is a block diagram of a typical computer system used for implementing embodiments of the present subject matter, such as those shown in FIGS. 1-18.

FIG. 18 shows an example of a suitable computing system environment for implementing embodiments of the present subject matter. FIG. 18 and the following discussion are intended to provide a brief, general description of a suitable computing environment in which certain embodiments of the inventive concepts contained herein may be implemented.

A general computing device, in the form of a computer 1810, may include a processor 1802, memory 1804, removable storage 1801, and non-removable storage 1814. Computer 1810 additionally includes a bus 1805 and a network interface 1812.

Computer 1810 may include or have access to a computing environment that includes one or more user input modules 1816, one or more output modules 1818, and one or more communication connections 1820 such as a network interface card or a USB connection. The one or more output devices 1818 can be a display device of computer, computer monitor, TV screen, plasma display, LCD display, display on a digitizer, display on an electronic tablet, and the like. The computer 1810 may operate in a networked environment using the communication connection 1820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 1804 may include volatile memory 1806 and non-volatile memory 1808. A variety of computer-readable media may be stored in and accessed from the memory elements of computer 1810, such as volatile memory 1806 and non-volatile memory 1808, removable storage 1801 and non-removable storage 1814. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 1802 of the computer 1810. For example, a program module 1825 may include machine-readable instructions capable of inputting syllables into an input panel of a handheld device according to the teachings and herein described embodiments of the present subject matter. In one embodiment, the program module 1825 may be included on a CD-ROM and loaded from the CD-ROM to a hard drive in non-volatile memory 1808. The machine-readable instructions cause the computer 1810 to encode according to the various embodiments of the present subject matter.

The operation of the computer system 1800 for recompiling executable code to improve performance is explained in more detail with reference to FIG. 1.

The above-described technique uses very little screen real estate for inputting syllables. The above process is easy to learn and use. The above technique is a handwriting based input of vowels and consonants. The technique follows a natural writing order that has a progressive display area that is close to the writing area to reduce eye-jumping/visual-disconnect. Furthermore, the above technique limits the character recognition to a few isolated vowels and consonants, thereby improving recognition accuracy and user experience. Also, the above technique is fast as it requires very little seek time for vowels and consonants because of handwriting input, rapid recall and entry of modifiers owing to their arrangement at familiar/natural positions, and requires single-tap correction of symbol recognitions errors. Moreover, the display panel in the above technique is disposed substantially closer to the writing area in the modifier panel to reduce eye jumping and facilitate faster syllabic entry.

Although, the above example embodiments shown in FIGS. 1-18 are explained with reference to stylus based syllabic inputs into a handheld device, such as the PDA shown in FIGS. 1-18, the above-described technique is not limited to only stylus based inputs, but it can be applicable for touch based inputs and the like.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-18 are merely representational and are not drawn to scale. Certain proportions thereof may be exaggerated, while others may be minimized. FIGS. 1-18 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method for a syllabic character entry into a handheld device comprising:
    drawing a desired base syllabic character using a stylus in a writing area on a syllabic level user interface disposed on the handheld device;
    determining whether a modifier is needed to the drawn desired base syllabic character, wherein the modifier comprises at least one of a consonant modifier, half consonant modifier and vowel modifier; and
    if the modifier is needed to the drawn desired base syllabic character,
        inputting associate data of a desired one of modifiers along with the drawn desired syllabic character to a base syllabic character recognizer by tapping on the desired one of modifiers that are disposed substantially around the writing area of a modifier panel in natural positions with respect to the base syllabic character;
        clearing the writing area upon tapping on the desired one of the modifiers;
        producing a candidate syllabic character including the tapped desired one of the modifiers by the base syllabic character recognizer upon recognition of the associated data; and
        displaying the produced candidate syllabic character using a first contrasting color in a progressive display panel.

2. The method of claim 1, further comprising:
    if the modifier is not needed to the drawn desired base syllabic character,
        producing a candidate syllabic character by the base syllabic character recognizer upon tapping a tapping area located in the writing area and inputting the associated data into the base syllabic character recognizer;
        clearing the writing area upon tapping the tapping area; and
        displaying the produced candidate syllabic character in the progressive display panel of the syllabic level user interface in the first contrasting color.

3. The method of claim 1, further comprising:
    determining whether another modifier is needed to the produced candidate syllabic character; and
    if the another modifier is needed to the produced candidate syllabic character,
        tapping on another one of the modifiers disposed substantially around the writing area of the modifier panel;
        producing a candidate syllabic character including the tapped another one of the modifiers upon tapping of another desired modifier along with the produced candidate syllabic character; and
        displaying the candidate syllabic character on the progressive display panel in the first contrasting color.

4. The method of claim 3, further comprising:
    repeating the determining, inputting, producing and displaying steps for another desired modifier until the desired syllabic character is formed on the progressive display panel.

5. The method of claim 1, further comprising:
    producing first top five hypothesis candidate base syllabic characters upon inputting the associated data of the drawn base syllabic character;
    displaying the first top five hypothesis candidate base syllabic characters in a symbol correction panel substantially along with the displaying of the candidate syllabic character in the progressive display panel, wherein the first top five hypothesis candidate base syllabic characters are displayed in a progressive contrasting color to indicate a hypothesis level;
    determining whether the displayed candidate syllabic character is the desired syllabic character;
    if the displayed candidate syllabic character is not the desired syllabic character, determining whether any one of the displayed first top five hypothesis candidate base syllabic characters is the desired base syllabic character; and
    if any one of the displayed first top five hypothesis candidate base syllabic characters is the desired base syllabic character, then tapping a desired one of the first top five hypothesis candidate syllabic characters displayed in the symbol correction panel using the stylus.

6. The method of claim 5, further comprising:
    if any one of the displayed first top five hypothesis candidate base syllabic characters is not the desired base syllabic character,
        tapping a next hypothesis candidate button located in a top right corner of the symbol correction panel to display a second top five hypothesis candidate base syllabic characters in the symbol correction panel;
        determining whether any one of the displayed second top five hypothesis candidate base syllabic characters is the desired base syllabic character;
        if any one of the displayed second top five hypothesis candidate base syllabic characters is the desired base syllabic character, then tapping a desired one of the second top five hypothesis candidate syllabic characters displayed in the symbol correction panel using the stylus; and
        if any one of the displayed second top five hypothesis candidate base syllabic characters is not the desired base syllabic character, repeating the steps of tapping and determining.

7. The method of claim 6, further comprising:
    displaying one or more hypothesis words in a dictionary area located in the syllabic level user interface upon inputting the associated data of the drawn base syllabic character;
    determining whether any one of the one or more hypothesis words displayed in the dictionary area is a desired word; and
    if any one of the one or more hypothesis words displayed in the dictionary area is the desired word, selecting one of the displayed one or more hypothesis words by double tapping on the desired one of the one or more hypothesis words displayed in the dictionary area.

8. The method of claim 7, further comprising:
    if any one of the one or more hypothesis words displayed in the dictionary area is not the desired word, repeating the drawing, determining, inputting, producing, and displaying steps to select a next desired base syllabic character until the desired word is formed and displayed in the progressive display panel.

9. The method of claim 8, further comprising:
    inputting the formed word displayed in the progressive display panel into an application display area upon obtaining the desired word in the progressive display area by tapping a space button provided in an upper panel area of the syllabic level user interface; and
    clearing the formed word from the progressive display area upon inputting the formed word into the application display area.

10. The method of claim 1, wherein the base syllabic character is selected from the group consisting of vowels, consonants, half-consonants, special consonant conjuncts, and special syllabic characters.

11. The method of claim 1, in tapping the desired one of the modifiers that is disposed substantially around the writing area of the modifier panel, the modifiers are displayed in their naturally expected positions associated with the drawn base syllabic character to reduce seek time.

12. The method of claim 1, further comprising:
clearing wrongly drawn base syllabic character from the writing area by tapping a clear button located in a lower right hand corner of the syllabic level user interface when the drawn base syllabic character is wrongly drawn.

13. An article comprising:
a non-transitory computer readable storage medium having instructions, that when executed by a computing platform, result in execution of a method for inputting syllables into a computer comprising:
drawing a desired base syllabic character using a stylus in a writing area on a syllabic level user interface disposed on the handheld device;
determining whether a modifier is needed to the drawn desired base syllabic character, wherein the modifier comprises at least one of a consonant modifier, half consonant modifier and vowel modifier; and
if the modifier is needed to the drawn desired base syllabic character,
inputting associate data of a desired one of modifiers along with the drawn desired syllabic character to a base syllabic character recognizer by tapping on the desired one of modifiers that are disposed substantially around the writing area of a modifier panel in natural positions with respect to the base syllabic character;
clearing the writing area upon tapping on the desired one of the modifiers;
producing a candidate syllabic character including the tapped desired one of the modifiers by the base syllabic character recognizer upon recognition of the associated data; and
displaying the produced candidate syllabic character using a first contrasting color in a progressive display panel.

14. A computer system comprising:
a computer network, wherein the computer network has a plurality of network elements, and wherein the plurality of network elements has a plurality of network interfaces;
a network interface;
an input module coupled to the network interface that receives topology data via the network interface;
a processing unit; and
a memory coupled to the processor, the memory having stored therein code associated with syllable input, the code causes the processor to perform a method comprising:
drawing a desired base syllabic character using a stylus in a writing area on a syllabic level user interface disposed on the handheld device;
determining whether a modifier is needed to the drawn desired base syllabic character, wherein the modifier comprises at least one of a consonant modifier, half consonant modifier and vowel modifier; and
if the modifier is needed to the drawn desired base syllabic character,
inputting associate data of a desired one of modifiers along with the drawn desired syllabic character to a base syllabic character recognizer by tapping on the desired one of modifiers that are disposed substantially around the writing area of a modifier panel in natural positions with respect to the base syllabic character;
clearing the writing area upon tapping on the desired one of the modifiers;
producing a candidate syllabic character including the tapped desired one of the modifiers by the base syllabic character recognizer upon recognition of the associated data; and
displaying the produced candidate syllabic character using a first contrasting color in a progressive display panel.

15. The system of claim 14, further comprising:
if the modifier is not needed to the drawn desired base syllabic character,
producing a candidate syllabic character by the base syllabic character recognizer upon tapping a tapping area located in the writing area and inputting the associated data into the base syllabic character recognizer;
clearing the writing area upon tapping the tapping area; and
displaying the produced candidate syllabic character in the progressive display panel of the syllabic level user interface in the first contrasting color.

16. The system of claim 14, further comprising:
determining whether another modifier is needed to the produced candidate syllabic character; and
if the another modifier is needed to the produced candidate syllabic character,
tapping on another one of the modifiers disposed substantially around the writing area of the modifier panel;
producing a candidate syllabic character including the tapped another one of the modifiers upon tapping of another desired modifier along with the produced candidate syllabic character; and
displaying the candidate syllabic character on the progressive display panel in the first contrasting color.

17. The system of claim 16, further comprising:
repeating the determining, inputting, producing and displaying steps for another desired modifier until the desired syllabic character is formed on the progressive display panel.

18. The system of claim 14, further comprising:
producing first top five hypothesis candidate base syllabic characters upon inputting the associated data of the drawn base syllabic character;
displaying the first top five hypothesis candidate base syllabic characters in a symbol correction panel substantially along with the displaying of the candidate syllabic character in the progressive display panel, wherein the first top five hypothesis candidate base syllabic characters are displayed in a progressive contrasting color to indicate a hypothesis level;
determining whether the displayed candidate syllabic character is the desired syllabic character;
if the displayed candidate syllabic character is not the desired syllabic character, determining whether any one of the displayed first top five hypothesis candidate base syllabic characters is the desired base syllabic character; and if any one of the displayed first top five hypothesis candidate base syllabic characters is the desired base syllabic character, then tapping a desired one of the first top five hypothesis candidate syllabic characters displayed in the symbol correction panel using the stylus.

19. The system of claim 18, further comprising:

if any one of the displayed first top five hypothesis candidate base syllabic characters is not the desired base syllabic character, tapping a next hypothesis candidate button located in a top right corner of the symbol correction panel to display a second top five hypothesis candidate base syllabic characters in the symbol correction panel;

determining whether any one of the displayed second top five hypothesis candidate base syllabic characters is the desired base syllabic character;

if any one of the displayed second top five hypothesis candidate base syllabic characters is the desired base syllabic character, then tapping a desired one of the second top five hypothesis candidate syllabic characters displayed in the symbol correction panel using the stylus; and if any one of the displayed second top five hypothesis candidate base syllabic characters is not the desired base syllabic character, repeating the steps of tapping and determining.

20. The system of claim 19, further comprising:

displaying one or more hypothesis words in a dictionary area located in the syllabic level user interface upon inputting the associated data of the drawn base syllabic character;

determining whether any one of the one or more hypothesis words displayed in the dictionary area is a desired word; and if any one of the one or more hypothesis words displayed in the dictionary area is the desired word, selecting one of the displayed one or more hypothesis words by double tapping on the desired one of the one or more hypothesis words displayed in the dictionary area.

21. The system of claim 20, further comprising:

if any one of the one or more hypothesis words displayed in the dictionary area is not the desired word, repeating the drawing, determining, inputting, producing, and displaying steps to select a next desired base syllabic character until the desired word is formed and displayed in the progressive display panel.

22. The system of claim 21, further comprising:

inputting the formed word displayed in the progressive display panel into an application display area upon obtaining the desired word in the progressive display area by tapping a space button provided in a upper panel area of the syllabic level user interface; and clearing the formed word from the progressive display area upon inputting the formed word into the application display area.

23. The method of claim 5, further comprising:

if the displayed candidate syllabic character is the desired syllabic character, repeating the steps of displaying the one or more hypothesis words, determining and selecting the displayed one or more hypothesis words.

24. The system of claim 18, further comprising:

if the displayed candidate syllabic character is the desired syllabic character, repeating the steps of displaying the one or more hypothesis words, determining and selecting the displayed one or more hypothesis words.

\* \* \* \* \*